United States Patent [19]
Nakajima et al.

[11] Patent Number: 5,541,909
[45] Date of Patent: Jul. 30, 1996

[54] OPTICAL DISC WITH PHASE PITS AND A REPRODUCING APPARATUS FOR DATA RECORDED ON THE OPTICAL DISC

[75] Inventors: Junji Nakajima, Yokohama; Kunikazu Ohnishi, Yokosuka; Tooru Sasaki, Yokohama; Makoto Miyamoto, Kanagawa-ken; Masaaki Kurebayashi, Ebina; Yoshio Suzuki, Yokohama; Masayuki Inoue, Yokohama; Hisamitsu Tanaka, Yokohama; Motoyuki Suzuki, Yokohama; Yukio Fukui, Tokyo, all of Japan

[73] Assignee: Hitachi, Ltd., Tokyo, Japan

[21] Appl. No.: 137,969

[22] Filed: Oct. 19, 1993

[30] Foreign Application Priority Data

Oct. 19, 1992 [JP] Japan .................................. 4-279673
Jun. 15, 1993 [JP] Japan .................................. 5-143925
Aug. 4, 1993 [JP] Japan .................................. 5-193311
Sep. 1, 1993 [JP] Japan .................................. 5-217201

[51] Int. Cl.$^6$ ........................................................ G11B 7/24
[52] U.S. Cl. .................................... 369/275.1; 369/13
[58] Field of Search .......................... 369/275.1, 284, 369/13, 275.2, 275.3, 110, 46.26, 275.4; 360/59, 114

[56] References Cited

U.S. PATENT DOCUMENTS 5,199,022 3/1993 Suzuki et al. ................... 369/275.1

FOREIGN PATENT DOCUMENTS 3-292632 12/1991 Japan .
4-167237 6/1992 Japan .
5-101400 4/1993 Japan .
5-101418 4/1993 Japan .
5-101431 4/1993 Japan .

OTHER PUBLICATIONS

"Superresolution Optical Head Technics", O plus E, 1992–9 No. 154, pp. 81–83 Sep. 5, 1992, New Technical Communications Ltd.

Primary Examiner—Ali Neyzari
Attorney, Agent, or Firm—Antonelli, Terry, Stout & Kraus

[57] ABSTRACT

A masking type light control layer for decreasing its reflection factor in a high-temperature region is formed on phase pits of an optical disc, and the phase pit depth is set to a predetermined value. A light spot for reproduction is shaped to an elliptical form and two sub-flux beams on the optical disc are spaced by 5/4 track pitch from a principal flux beam in the radial direction of the optical disc. The kind of optical disc is discriminated and reproduction laser power and characteristics of an equalizer circuit are switched in accordance with the type of an optical disc. Through this, a stable servo signal detection can be ensured and repetitive reproduction characteristics can be improved.

15 Claims, 18 Drawing Sheets

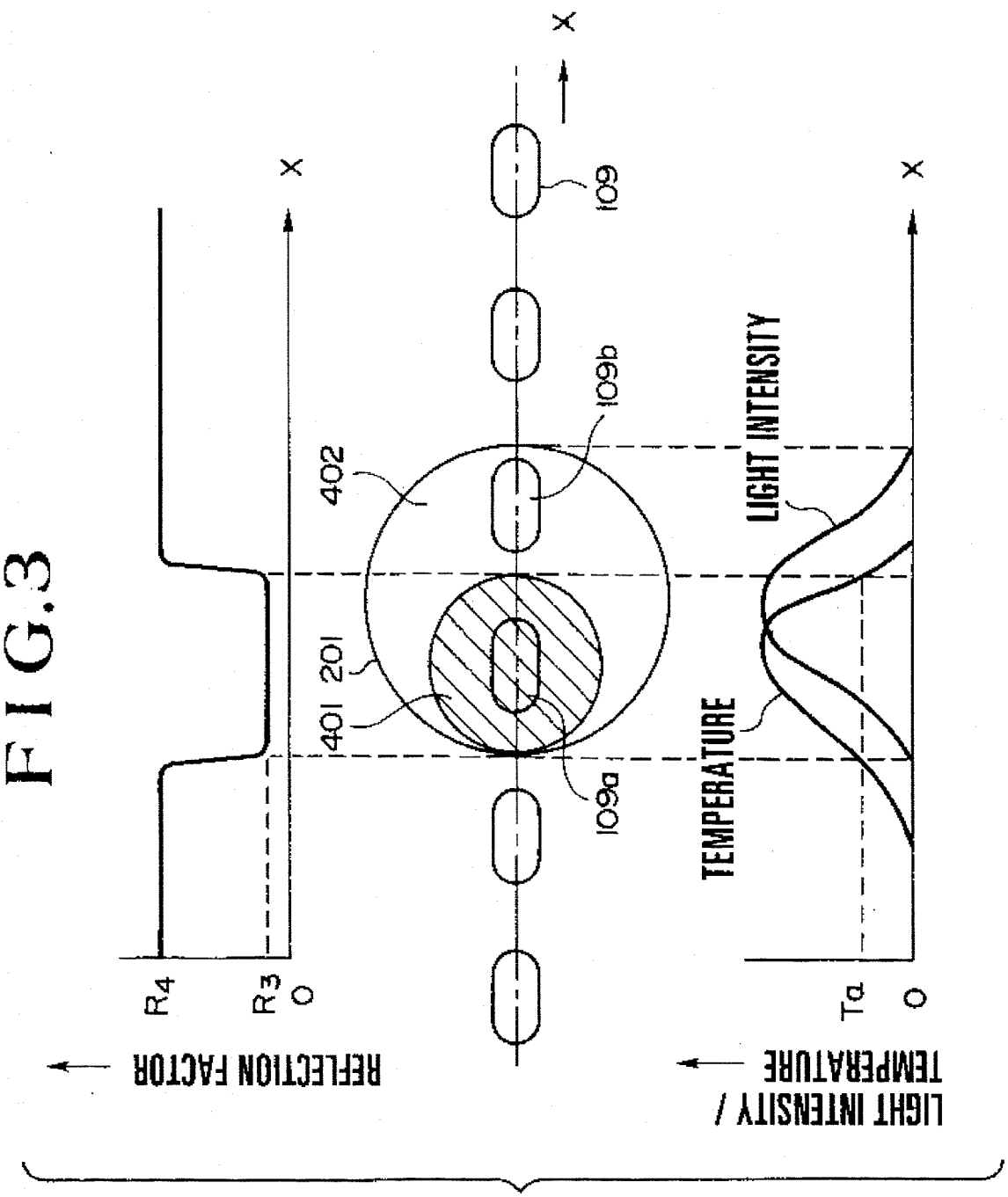

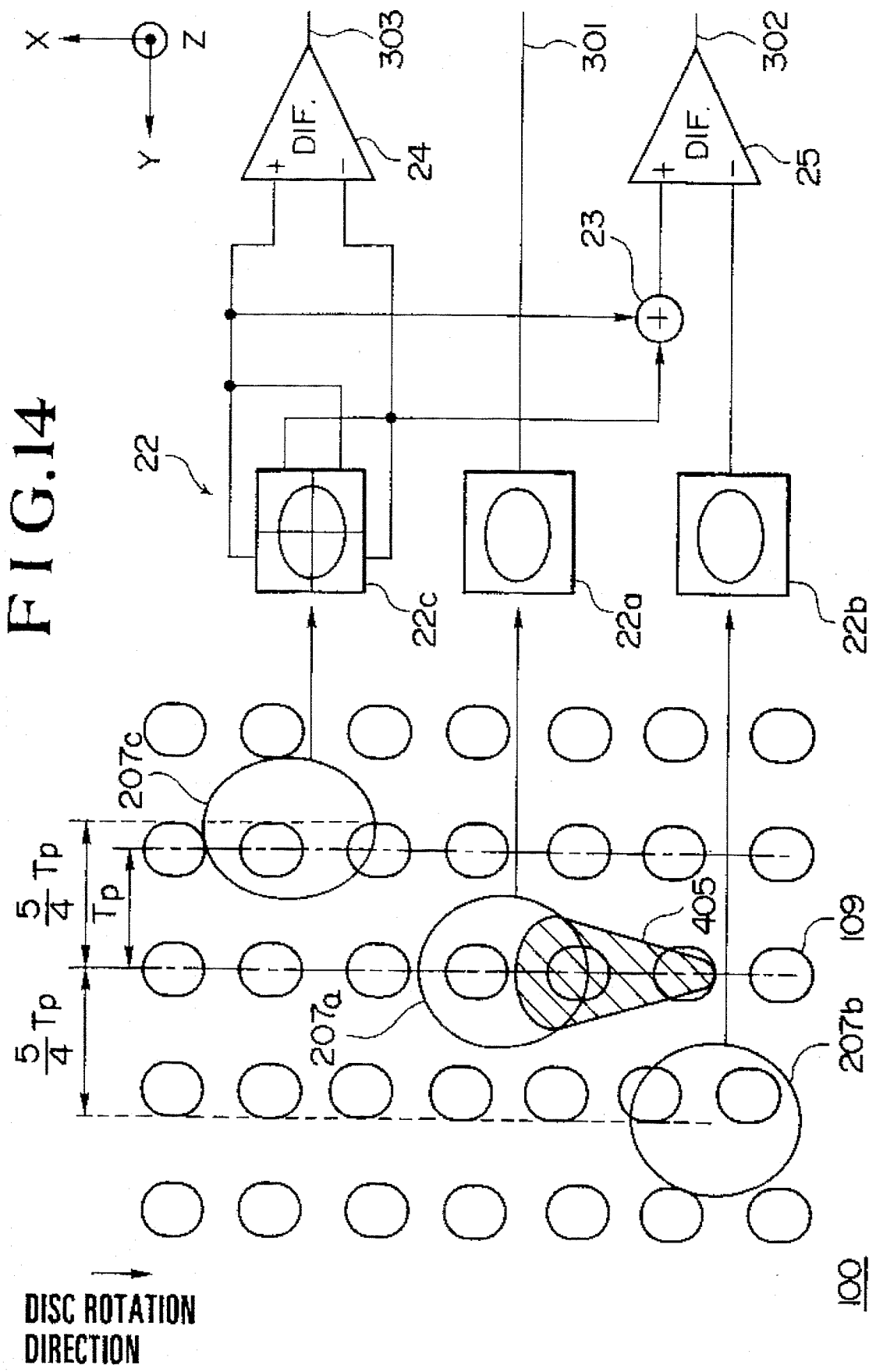

TRANSMITTIVITY OF FILTER

OPTICAL DISC WITH PHASE PITS AND A REPRODUCING APPARATUS FOR DATA RECORDED ON THE OPTICAL DISC

BACKGROUND OF THE INVENTION

The present invention relates to an optical disc formed with phase pits in accordance with an information signal and an optical signal reproducing apparatus for reproducing the information signal recorded in the form of the phase pits, and more particularly to an optical signal reproducing apparatus capable of reproducing phase pit information recorded at a high density which is higher than optical resolution.

Conventionally, in the optical signal reproducing apparatus such as a digital audio disc and a video disc (hereinafter simply referred to as an optical disc apparatus), phase pits complying with an information signal are formed in advance on the signal recording surface of a disc and by utilizing a phenomenon that a light spot for reproduction irradiating on one of the phase pits is reduced in reflection light quantity by diffraction, a decrease in reflection light quantity is detected by a photodetector to reproduce the information signal.

Signal reproduction resolution in the optical disc apparatus is substantially determined by a wavelength $\lambda$ of the light source for reproduction and a numerical aperture NA of the objective lens and the signal reproduction resolution is limited by a spatial frequency $2NA/\lambda$. Accordingly, in order to realize high-density reproduction, the wavelength $\lambda$ of the light source of reproduction optics (for example, a semiconductor laser) must be decreased and the numerical aperture NA of the objective lens must be increased.

Contrarily, an optical disc has been proposed in which a layer whose reflection factor changes with temperatures is provided on the optical disc formed with phase pits and a phase pit is read while the reflection factor is partly changed inside a scanning light spot for reproduction.

On the other hand, for focusing error detection or tracking error detection in the optical disc apparatus, an astigmatism method and a three-spot method have generally been employed which have an advantage that a detection system of an optical head can be simplified in construction to attain cost reduction.

In the three-spot method, any offset concomitant with movement of the objective lens and inclination of the optical disc does not occur and therefore this method is also applied to magneto-optical apparatus.

One may refer to, for example, JP-A-3-292632 as a literature relevant to the aforementioned optical disc.

SUMMARY OF THE INVENTION

An object of the present invention is to provide an optical disc and an optical disc apparatus which can reproduce phase pit information recorded at a high density which is higher than reproduction resolution determined by a wavelength of the light source and a numerical aperture of the objective lens, which can perform focusing draw-in operation steadily, which can reduce a variation in reflection light quantity due to a phase pit inside a masked region, which can perform stable repetitive reproduction without irradiating a separate light spot for initialization of the phase changing film, which can perform stable focusing and tracking control and which take exchangeability with the conventional phase pit type optical disc into consideration. To accomplish the above object, the optical disc and the optical disc apparatus according to the present invention are constructed as follows.

Firstly, a light control layer whose complex reflection factor or spectral characteristics of reflection factor change with temperatures or light intensity is provided on an optical disc formed with phase pits. More specifically, there is provided either a light control layer whose reflection factor decreases in a high-temperature region (hereinafter simply referred to as a high-temperature portion masking type light control layer) or a light control layer whose reflection factor increases in a high-temperature region for at least a first laser beam having a wavelength $\lambda_1$ and is more than a predetermined value regardless of temperature or light intensity for a second laser beam having a wavelength $\lambda_2$ (hereinafter simply referred to as a high-temperature portion window type light control layer). When reproducing an optical disc provided with the high-temperature portion window type light control layer, the first light spot formed of a first laser beam and the second light spot formed of a second laser beam are both irradiated on the signal recording surface of the optical disc by means of a single objective lens.

Secondly, the relation between a depth p of a phase pit formed in the optical disc and a difference $\Delta\theta$ between phase change amounts concomitant with a change in the complex reflection factor of the light control layer is set optimally.

Thirdly, the light spot for reproduction to be irradiated on the optical disc is shaped to an ellipse which is elongated in a direction of track tangent. In a state (so-called stand-by mode) other than a state in which phase pit information from the optical disc is reproduced and the information is delivered from the reproduction section to the outside (for example, a host computer, an external signal processing unit, a display, a loudspeaker or a voice/image signal processing unit), reproduction laser power is set to a lower level than a prescribed output in order to improve the life of repetitive reproduction of the disc.

Fourthly, two sub-flux beams on the optical disc are respectively set so as to be offset from a principal flux beam in the radial direction of the disc by ½ track pitch or more, for example, by 5/4 or 9/4 track pitch and at that case a tracking error signal is produced from the two sub-flux beams. A focus error signal is produced from either one of the two sub-flux beams.

Fifthly, to ensure exchangeability of reproduction for the conventional phase pit type optical disc and the optical disc capable of permitting reproduction of high density phase pit information, reproduction laser power is set after discrimination of optical disc is carried out and characteristics of an equalizer circuit are switched.

In the above optical disc or optical disc apparatus, operation to be described below is carried out.

Firstly, the high-temperature portion masking type light control layer has such characteristics that the disc exhibits a nearly zero reflection factor in a high-temperature region and a predetermined reflection factor in a low-temperature region. Accordingly, when a light spot is irradiated on this light control layer at a predetermined intensity level, the control layer partly assumes a high temperature near the intensity center of the light spot and a phase pit is masked, so that a phase pit signal is reproduced in a low-temperature region alone inside the light spot. Thus, the size of light spot contributing to reproduction can be made to be smaller than the actual light spot and therefore the signal reproducing resolution can be improved to exceed the conventional limit. Further, in the event that the light spot is defocused and light intensity per unit area in the light spot irradiated area is decreased, the whole of the light spot irradiated area behaves as a low-temperature region, that is, a high reflection factor region to provide a reflection beam. Therefore, with similar means to that in the general optical disc apparatus, draw-in operation of focusing control of the light spot can be effected.

On the other hand, the high-temperature portion window type light control layer has such characteristics that for light of wavelength $\lambda_1$, the light control layer exhibits a predetermined reflection factor in a high-temperature region and a nearly zero reflection factor in a low-temperature region. When the light spot for reproduction of wavelength $\lambda_1$ is irradiated on this light control layer at a predetermined light intensity level, a phase pit signal can be reproduced from only the high-temperature region inside the light spot. On the other hand, with a second laser beam having a wavelength of $\lambda_2$, a reflection light quantity in excess of a predetermined value can always be obtained regardless of the high-temperature and low-temperature regions. Accordingly, by irradiating the first and second light spots on the disc by means of the same objective lens, the reproduction of a phase pit signal can be effected with the first light spot and at the same time focusing and tracking control operations for the first and second light spots can be effected with the second light spot.

Secondly, in the light control layer, the reflection factor and the phase change amount change with temperatures to differ for the high-temperature and low-temperature regions. This is equivalent to the fact that a step having a depth p corresponding to a phase change difference $\Delta\theta$ is built between the high-temperature and low-temperature regions. Then, by setting d and p, where d is a depth of a phase pit, such that a reflection light quantity at the step of depth p equals a reflection light quantity at a step having a depth d+p, the masked region is seen as if it contains no phase pit when viewed from a reference of the high reflection factor region. As a result, the leakage of a signal representative of a phase pit inside the masked region can be reduced.

Thirdly, in order to reversibly change the phase changing film between an amorphous state and a crystallized state, not only the temperature of the phase changing film but also the cooling time therefor must be controlled and generally, the longer the cooling time after heating, the more easily the reversible change can be caused to take place. With a light spot for reproduction of the optical disc having an elliptical shape which is elongated in the track direction of the optical disc, the time for the light spot to pass through the phase changing film can be prolonged. As a result, the cooling time for the phase changing film becomes longer as compared to the case where the light spot is circular, thus ensuring that initialization of the phase changing film can be effected within a wide range of reproduction laser power and stable repetitive reproduction can be carried out. When the output power of the laser is set to a low output level in the stand-by condition to prevent the phase changing film from undergoing a state change, the frequency of changes of reflection factor of the disc can be decreased to improve the life of repetitive reproduction of the disc.

Fourthly, two sub-flux beams on the optical disc are scanned on tracks adjacent to a different track on which the principal flux beam scans and therefore they are not affected by a change in reflection factor of the light control layer even when the reaction speed thereof (or response time) is slow and the reflection factor change still proceeds. A focusing error signal is detected from either one of the two sub-flux beams. Through this, tracking and focusing error signals can both be detected stably.

Fifthly, since the reproduction laser power or characteristics of the equalizer circuit are switched in accordance with the kind of optical disc, an optimum reproduction waveform can be obtained with any type of optical disc and saturation of operation of circuits due to an increased reflection light quantity can be avoided.

BRIEF DESCRIPTION OF THE DRAWINGS

FIG. 3 is a diagram showing the operational principle of the optical disc having the characteristics shown in FIG. 1;

FIG. 14 is a diagram showing a servo signal detecting method in the second embodiment of the optical disc according to the invention;

DESCRIPTION OF THE PREFERRED EMBODIMENTS

The present invention will now be described by way of example with reference to the accompanying drawings.

Figure 1:
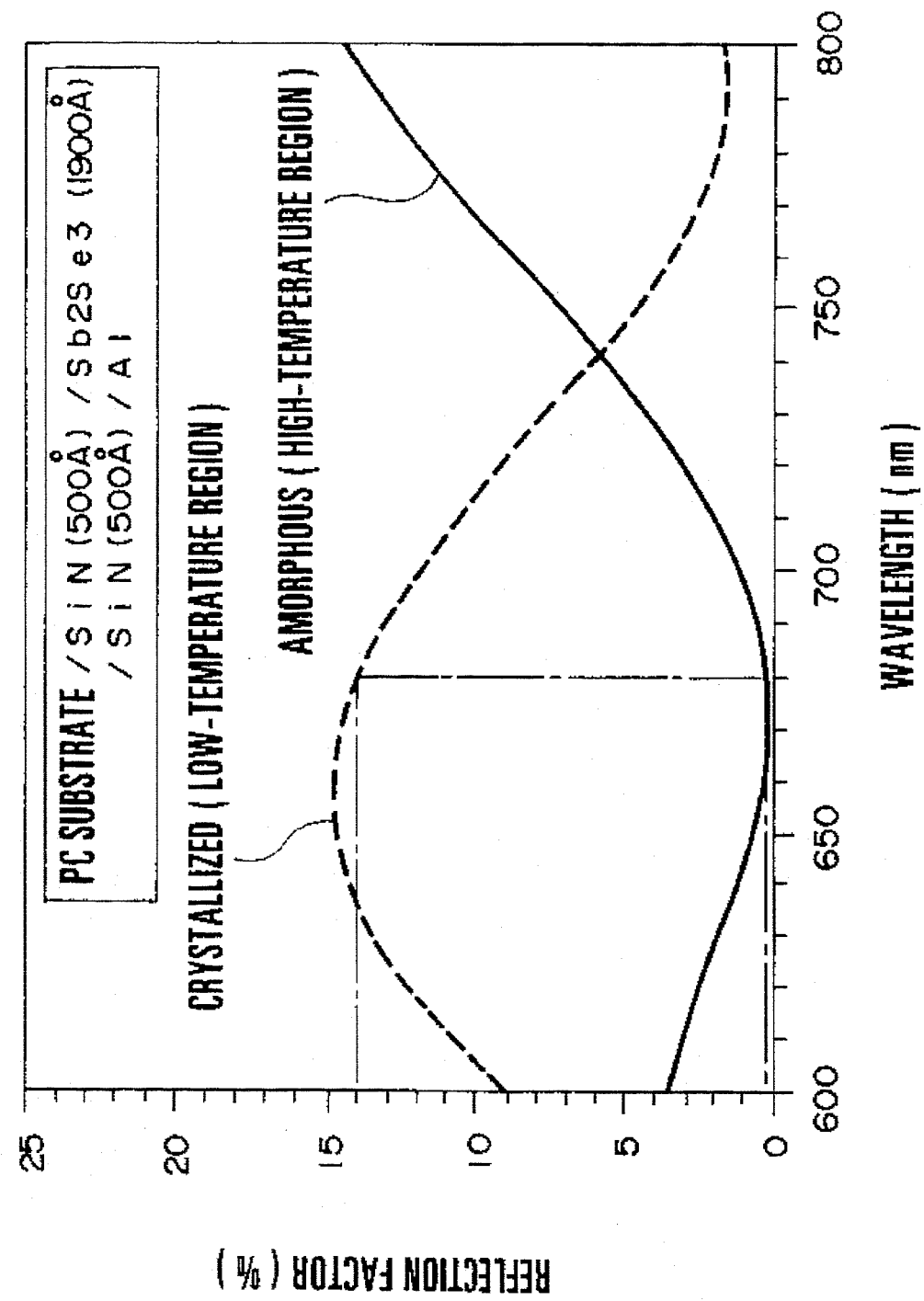
FIG. 1 is a graph of characteristics showing reflection factors in a first embodiment of an optical disc according to the present invention.

FIG. 1 is a graph of characteristics showing reflection factors exhibited in low-temperature and high-temperature regions by a high-temperature portion masking type light control layer of an embodiment of an optical disc according to the present invention. The characteristics shown in the drawing are obtained with an optical disc structure shown in FIG. 2 when this structure is conditioned by the fact that a transparent substrate 101 is made of polycarbonate, a phase changing film 104 is made of $Se_2 Sb_3$, first and second light interference films 103 and 105 are each made of SiN, the phase changing film 104 has a thickness of 1900Å and each of the light interference films 103 and 105 has a thickness of 500Å. When a light control layer 102 composed of the phase changing film 104 and the light interference films 103 and 105 is constructed in this manner, the light control layer exhibits a reflection factor of about 14% in the low-temperature region (in which the $Se_2 Sb_3$ film is crystallized) and a reflection factor of nearly zero in the high-temperature region (in which the $Se_2 Sb_3$ film becomes amorphous) under the irradiation of a laser beam having a wavelength $\lambda$ of 680 nm.

FIG. 3 diagrammatically shows the principle of phase pit signal reproduction in the case where a laser beam spot having a wavelength $\lambda$ of 680 nm is irradiated on the optical disc provided with the aforementioned high-temperature portion masking type light control layer. As shown in the Figure, in a region 401 in which the phase changing film 104 is caused by optical energy of a light spot 201 to have a temperature exceeding a predetermined temperature Ta, the $Se_2 Sb_3$ film becomes amorphous to exhibit a reflection factor of nearly zero and consequently, in a phase pit train 109 formed in the signal recording surface of the optical disc, a phase pit 109a inside the region 401 is masked with the light control layer 102 and only a phase pit 109b inside a crystallized region 402 is detected. In this manner, the size of a light spot contributing to reproduction can be made to be smaller than the actual light spot and as a result, a signal indicative of information consisting of phase pits formed at a high density in excess of optical resolution can be reproduced.

Incidentally, in the optical disc provided with the high-temperature portion masking type light control layer, a focusing error signal can be detected in a similar way to the detection in an ordinary optical disc apparatus. This will be described below.

Figures 4A, 4B:
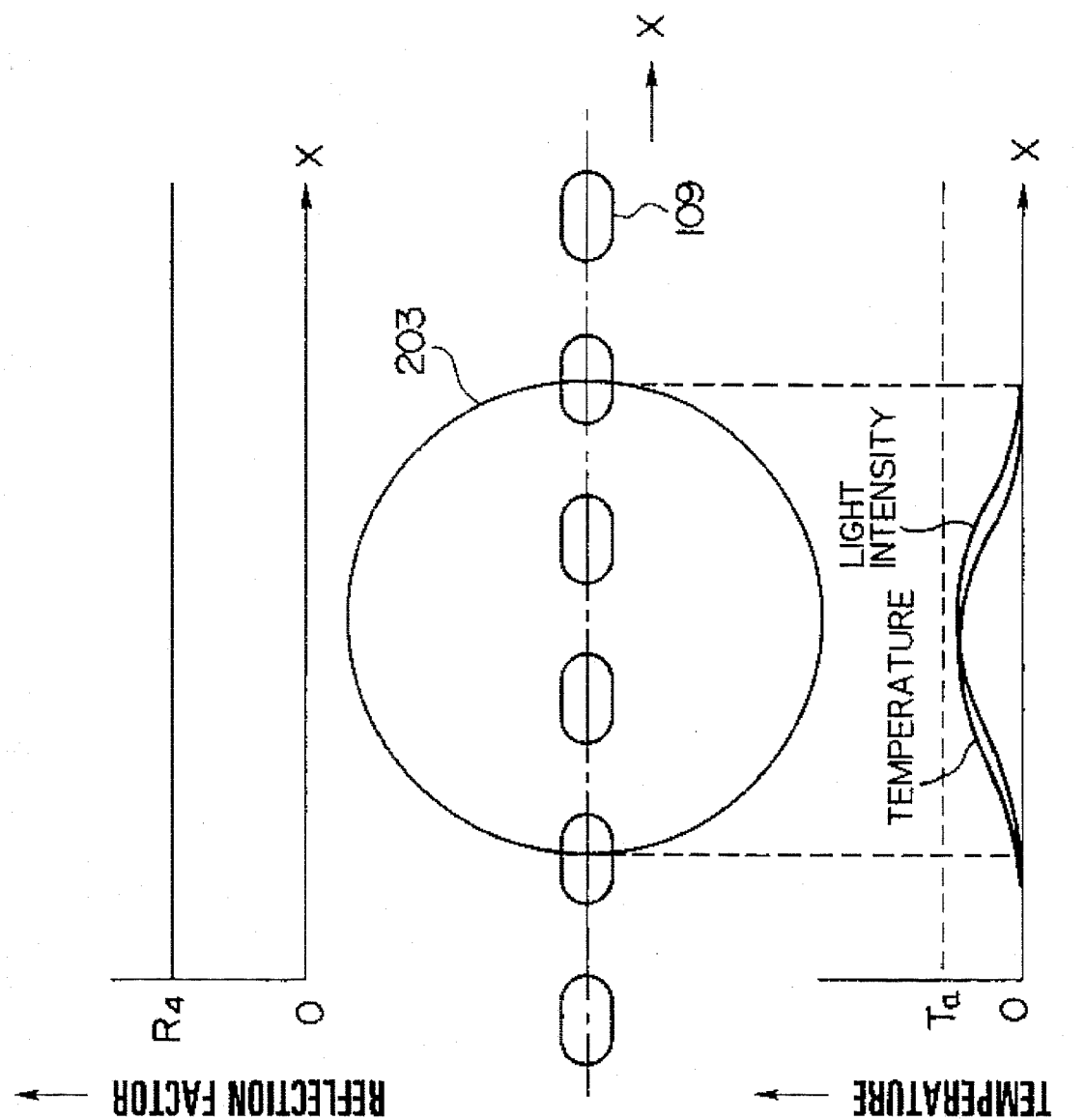
FIGS. 4A and 4B are diagrams showing the principle of operation, upon defocusing, of the optical disc having the characteristics shown in FIG. 1.

FIGS. 4A and 4B diagrammatically show the temperature distribution and reflection factor exhibited by the phase changing film 104 for a defocused light spot 203. With the defocused light spot 203 irradiated, the irradiation area increases as shown in FIG. 4B and light intensity per unit area in the light spot decreases. Therefore, the temperature of the $Se_2 Sb_3$ film of the light control layer 102 is not raised up to the temperature Ta for rendering this film amorphous and the entire region irradiated with the light spot 203 remains crystallized (exhibiting a high reflection factor). Consequently, as in the case of the ordinary optical disc apparatus, reflection light from the whole of the light spot irradiated area can be detected to permit detection of a focusing error signal produced through, for example, an astigmatism method. A tracking error signal can be detected through, for example, a three-spot method by setting the light intensity of sub-flux beams to a low value which does not cause the light control layer 102 to reach the temperature Ta. (This will be detailed hereinafter.)

Figure 5:
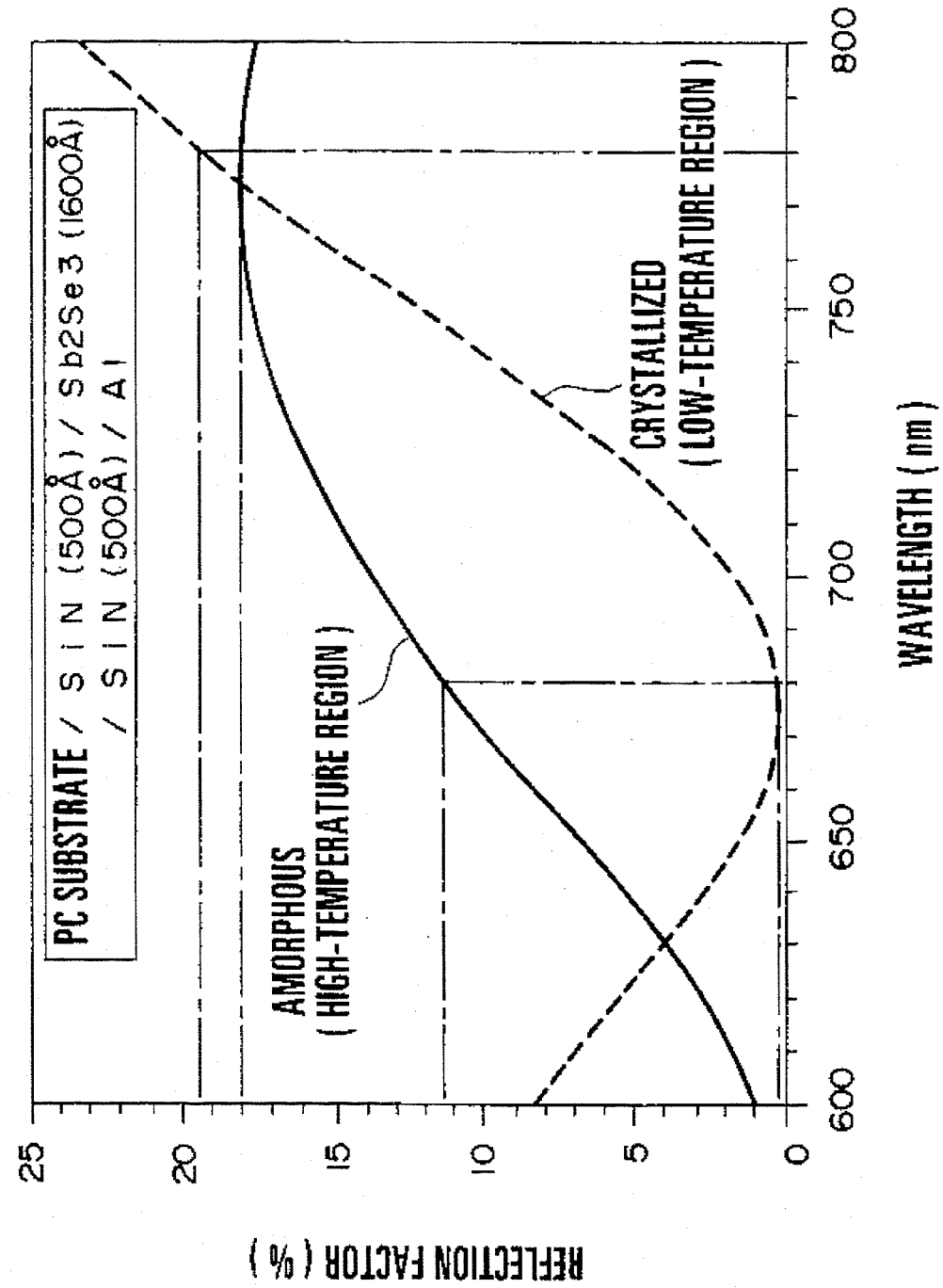
FIG. 5 is a graph of characteristics showing reflection factors in a second embodiment of the optical disc according to the present invention.

FIG. 5 is a graph of characteristics showing reflection factors exhibited by a high-temperature portion window type light control layer of a second embodiment of an optical disc according to the present invention when the light control layer is in low-temperature and high-temperature states. The characteristics shown in the Figure are obtained with the same structure and material as those in the first embodiment with the only exception that the phase changing film 104 ($Se_2 Sb_3$) has a thickness of 1600Å. As shown in the Figure, under the irradiation of a laser beam of a wavelength $\lambda_1$ of 680 nm, the light control layer exhibits a reflection factor of nearly zero in the low-temperature region (in which the $Se_2 Sb_3$ film is crystallized) and a reflection factor of about 11% in the high-temperature region (in which the $Se_2 Sb_3$ film becomes amorphous). Further, when a laser beam of a wavelength $\lambda_2$ of 780 nm is irradiated, the light control layer exhibits a reflection factor of more than 18% regardless of temperatures in both the low-temperature and high-temperature regions.

Figure 6:
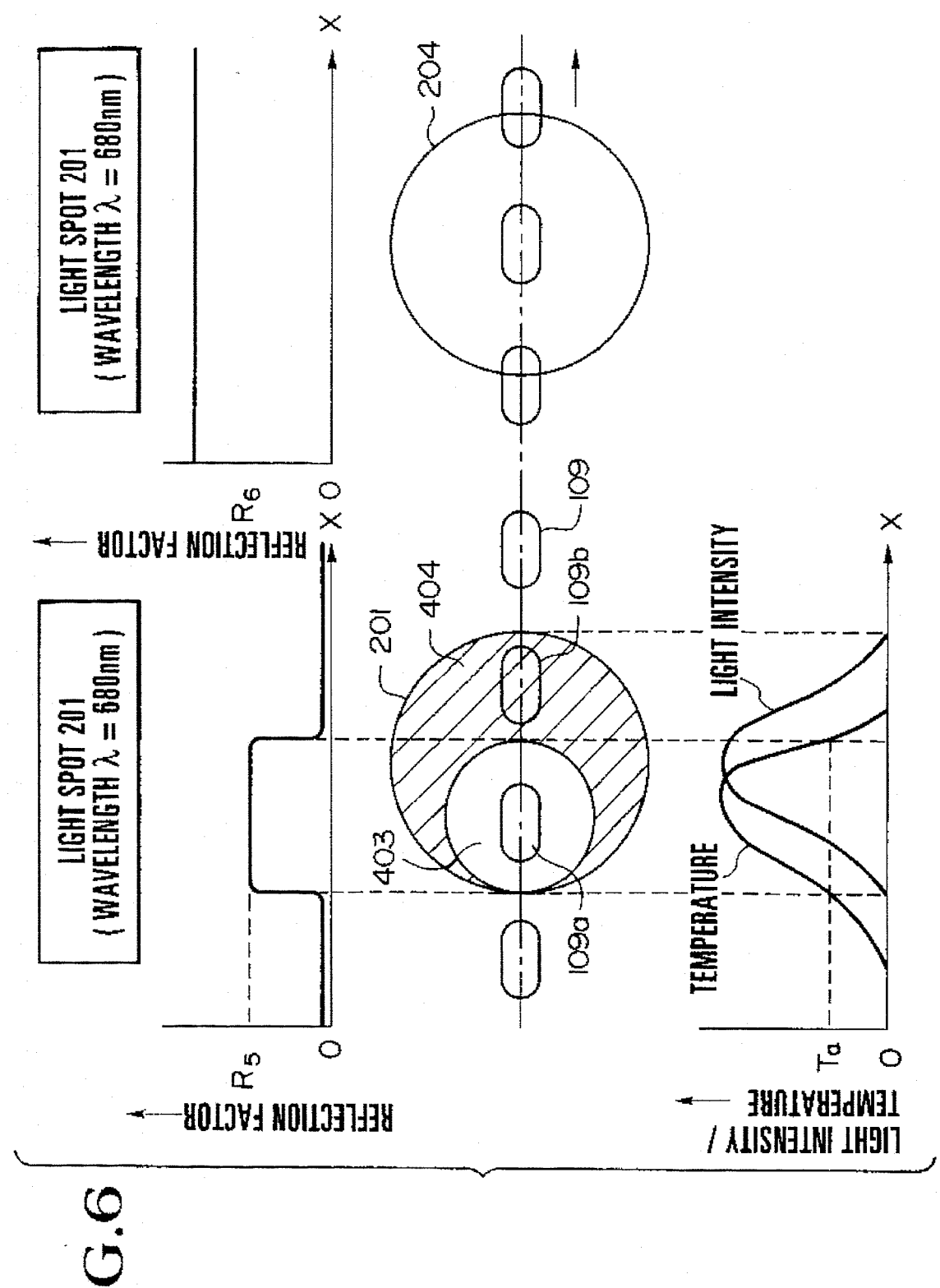
FIG. 6 is a diagram showing the operational principle of the optical disc having the characteristics shown in FIG. 5.

FIG. 6 diagrammatically shows conditions when a laser beam spot of a wavelength $\lambda_1$=680 nm and a laser beam spot of $\lambda_2$=780 nm are independently irradiated on the optical disc provided with the above high-temperature portion window type light control layer. For the beam spot 201 of 680 nm wavelength $\lambda_1$, the $Se_2 Sb_3$ film becomes amorphous to have a predetermined reflection factor R5 in a region 403 where the phase changing film 104 has a temperature which exceeds the predetermined value Ta, exactly conversely to the case of the high-temperature portion masking type light control layer shown in the first embodiment, and hence a phase pit 109a inside that region can be detected. In contrast, a phase pit 109b inside a crystallized region 404 is masked and cannot be detected. As a result, a signal indicative of information consisting of phase pits formed at a high density in excess of optical resolution can therefore be reproduced as in the case of the first embodiment.

On the other hand, for the light spot 204 of 780 nm wavelength $\lambda_2$, light reflected from the whole of the light spot irradiated are a at a reflection can always be detected at a reflection factor R6 inexcess of the predetermined value regardless of the phase state inside the irradiated area. Accordingly, a focusing error signal and a tracking error signal can be detected from the light spot 204.

Figure 7:
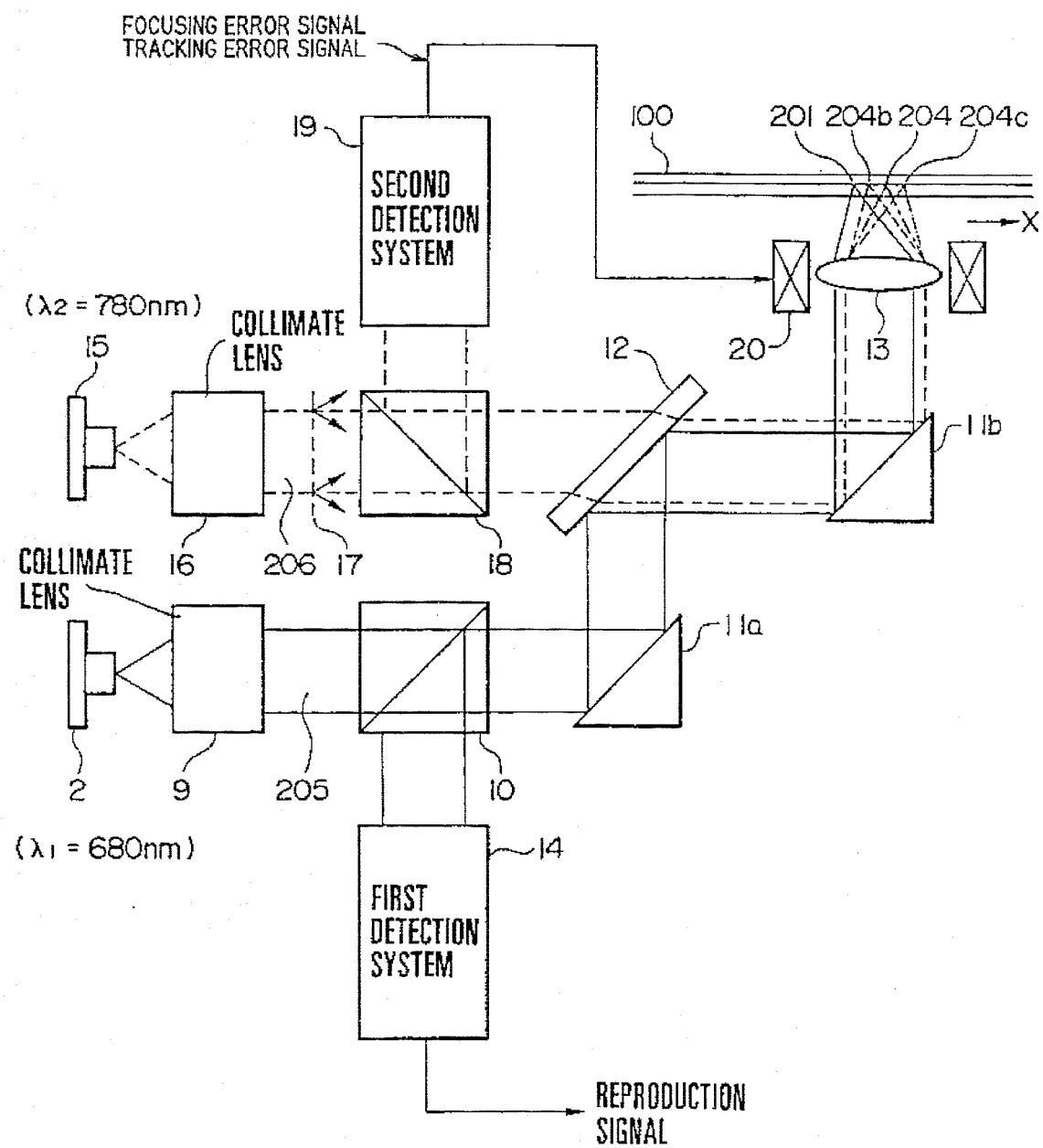
FIG. 7 is a schematic block diagram showing a first embodiment of an optical disc apparatus according to the invention.

FIG. 7 is a schematic block diagram showing an example of construction of an optics in a first embodiment of an optical disc apparatus in which an optical disc provided with the above high-temperature portion window type light control layer. A laser beam having a wavelength $\lambda_1$ of 680 nm and emitted from a semiconductor laser 2 is converted into parallel flux 205 by means of a collimate lens 9, passed through beam splitter 10, light path change mirror 11a, dichroic filter 12 and light path change mirror 11b and focused on the signal recording surface of an optical disc 100 by means of an objective lens 13 to form a light spot 201. After reflected by the optical disc 100, this light spot 201 returns along the same light path as the forward path to reach the beam splitter 10 and part of this light spot is reflected by the beam splitter 10 to come in a first detection system 14 composed of a known phase pit signal detection unit (not shown). Thanks to the aforementioned effects of the window type light control layer, a phase pit recorded on the optical disc 100 is reproduced at high reproduction resolution.

On the other hand, a laser beam of 780 nm wavelength $\lambda_2$ emitted from a semiconductor laser 15 is converted into parallel flux 206 by means of a collimate lens 16 and divided into three flux beams of 0-th order diffraction beam and ± first order diffraction beams by means of a diffraction grating 17. These beams pass through beam splitter 18, dichroic filter 12 and light path change mirror 11b and like the flux 205, they are focused on the optical disc 100 by means of the objective lens 13 to form light spots 204, 204b and 204c.

After reflected by the optical disc 100, these light spots return along the same light path as the forward path to reach the beam splitter 18 and part of each of them is reflected by the beam splitter 18 to come in a second detection system 19. In the second detection system 19, a focusing error signal of the light spot 204 is detected by a known detection unit (not shown) based on, for example, the astigmatism method and a tracking error signal of the light spot 204 is detected by a known detection unit (not shown) based on, for example, the three-spot method. The thus detected error signals are fed back to a two-dimensional actuator 20 for driving the objective lens 13 to control the position thereof. Incidentally, an achromatic lens which is corrected for chromatic aberration at least wavelength $\lambda_1$ and $\lambda_2$ is generally used as the objective lens 13. Accordingly, the light spots 201 and 204 are always irradiated on close positions on the same focal plane, for example, on the same track. Therefore, when the position of the objective lens is controlled such that the light spot 204 is irradiated on a given track on the recording surface provided in the optical disc 100, the light spot 201 for phase pit signal reproduction, too, can automatically be irradiated accurately on that given track.

It is not always necessary that the light spots 201 and 204 be irradiated on the same track, and they may be irradiated on adjacent tracks or on tracks which are more distant from each other. Both of the focusing error signal and the tracking error signal are detected from the light spot 204 in this embodiment but alternatively only the focusing error signal may be detected from the light spot 204 and the tracking error signal may be detected from the light spot 201. Further, an expedient can be conceived wherein tracking error signals are detected from both the light spots 201 and 204, focusing error and tracking error signals obtained from the light spot 204 are used to drive the two-dimensional actuator associated with the objective lens so as to control irradiation positions of the two spots relative to a track of the optical disc, the tracking error signal obtained from the light spot 201 is used to drive a flux deflection unit such as a rotary mirror provided in the light path of the flux 205 so as to correct a relative positional shift of the light spot 201 to the light spot 204.

Figure 8:
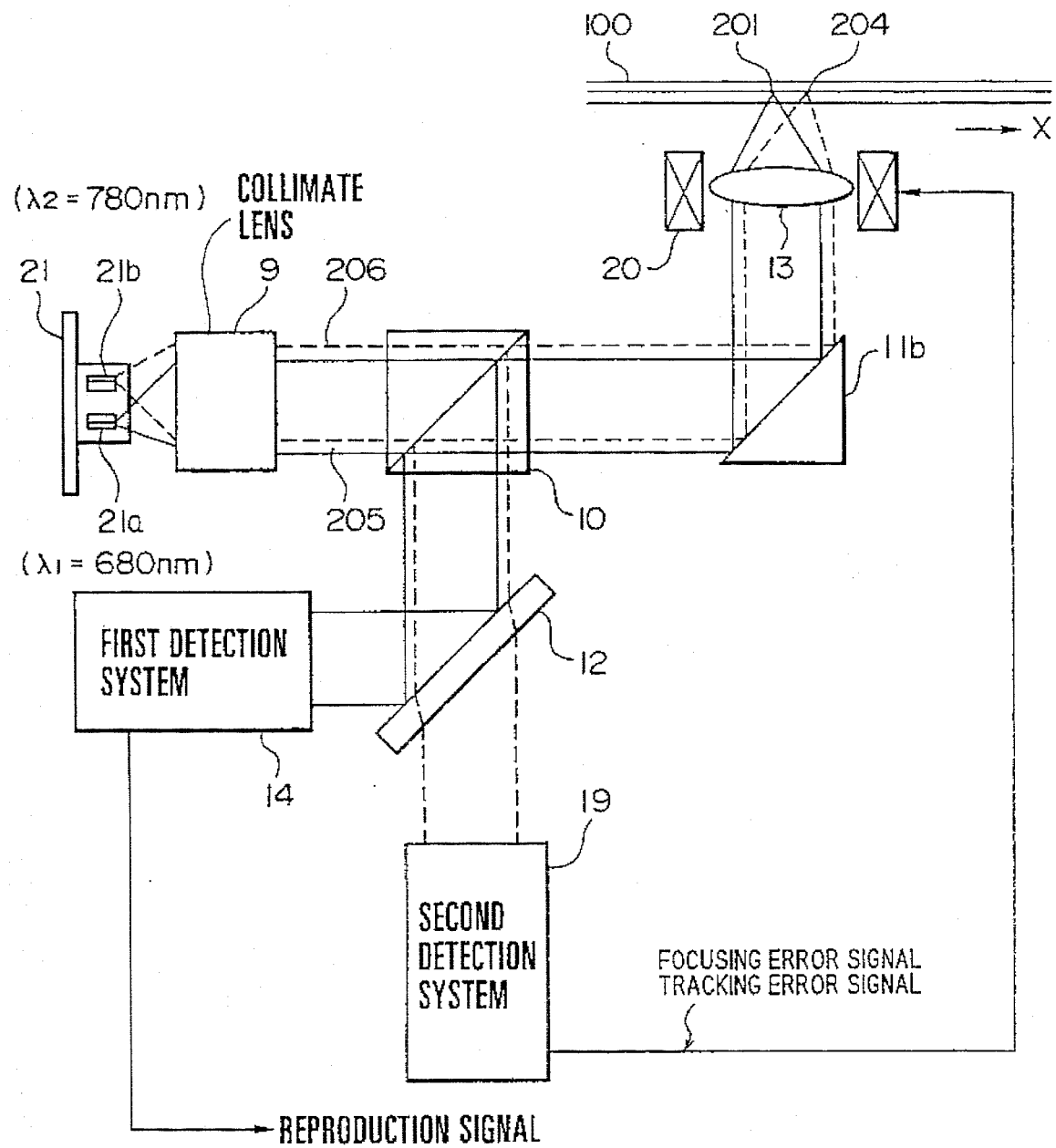
FIG. 8 is a schematic block diagram showing a modified embodiment of the optical disc apparatus according to the invention.

While in the present embodiment the two semiconductor lasers housed in separate packages are used as the light source, a monolithic type laser array having two semiconductor laser devices of different wavelengths arranged on the same substrate or a hybrid type multi-laser beam source having two semiconductor laser chips 21a and 21b of different wavelengths housed in a single package 21 as shown in FIG. 8 may also be used. When the light source as above is used, two flux beams of different wavelengths can be focused on the disc through one optics to facilitate simplification of optics and stabilization of light spot irradiation position.

Incidentally, a phase pit in the masked region inside a light spot for reproduction has been described as not affecting a reproduction signal in the foregoing description but practically, the reflection factor of the masked region is not exactly zero and hence a signal representative of that phase pit slightly leaks to the reproduction signal. Accordingly, an optical disc capable of reducing leakage of the signal representative of the masked phase pit will be described hereunder.

Figure 2:
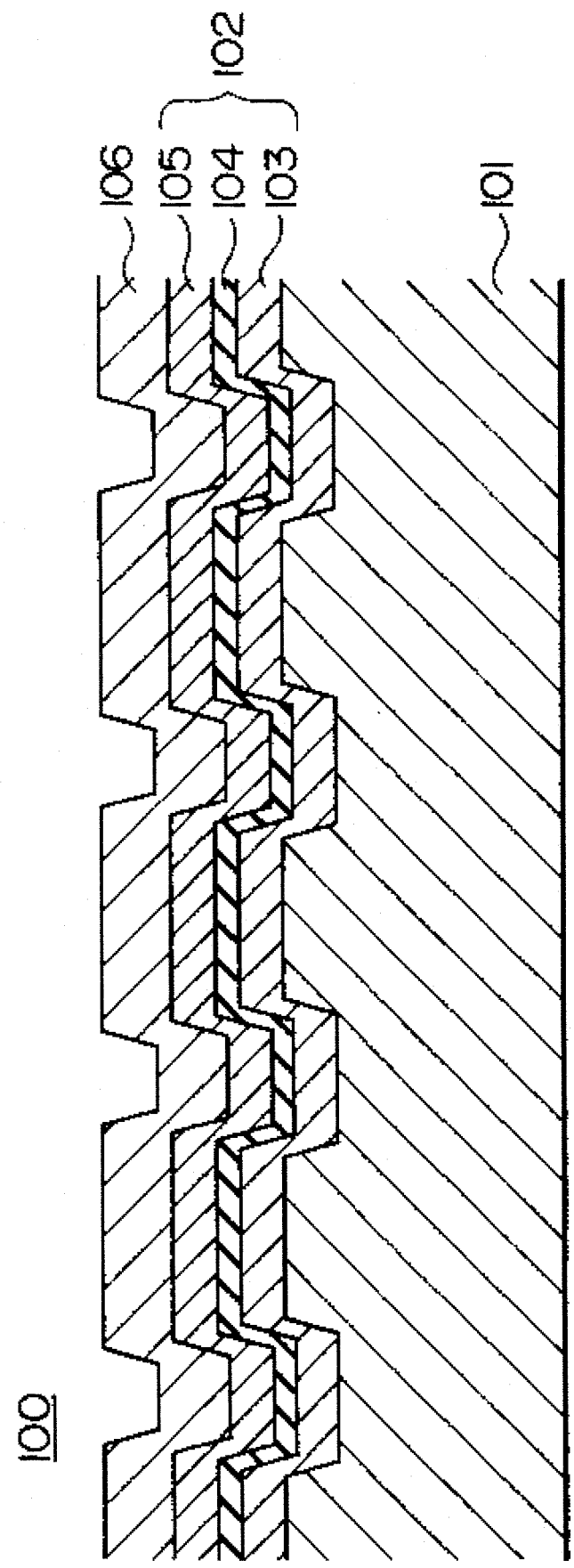
FIG. 2 is a schematic sectional view of an optical disc which permits reproduction of high density phase pit information.
Figure 9:
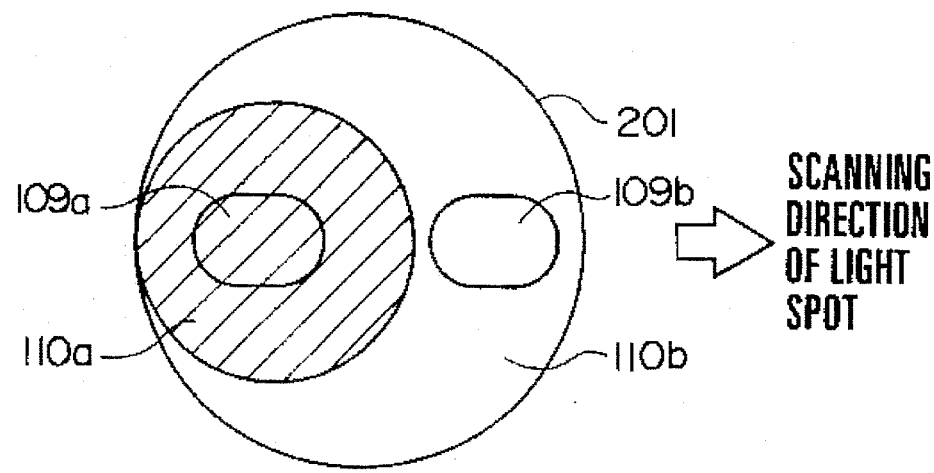
FIG. 9 is a diagram showing a third embodiment of the optical disc according to the invention.

FIG. 9 diagrammatically shows a third embodiment of the optical disc according to the present invention, depicting only an area on which a light spot 201 is irradiated. For use in the present embodiment, the structure and material of the optical disc structure shown in FIG. 2 is conditioned, for example, by the fact that the transparent substrate is made of polycarbonate, a reflection film 106 is made of Au, the phase changing film 104 is made of $In_3SbTe_2$, the first and second light interference films 103 and 105 are made of $ZnS-SiO_2$ and the phase pit has an optical depth d. With a light control layer 102 of the above phase changing film and light interference films used, the reflection factor is low when the phase changing film 104 is crystallized but is high when the phase changing film 104 becomes amorphous. Accordingly, when the light spot 201 scans in a direction of arrow, a region obliquely hatched in the Figure behaves as a window region and a region hatched horizontally behaves as a masked region. Incidentally, where reflection light changes its phase relative to incident light by phase change amount θ1 at the masked region and by phase change amount θ2 at the window region, there occurs a phase difference of θ2−θ1=Δθ between reflection beams from the mask and window regions. Optically, the above phenomenon is equivalent to the fact that a land 110b is stepped down by a depth p corresponding to Δθ at the boundary between the land 110b and a land 110a, where the land 110b is a portion devoid of phase pit inside the masked region and the land 110a is a similar portion inside the window region. Accordingly, when the masked region is viewed from the land 110a, there exist the land 110b of depth p and a phase pit 109b having a depth d+p. In that case, for the wavelength of the light source of the light spot 201 being λ, the depth p is related to the phase difference Δθ[rad] by $$p = \frac{\lambda \times \Delta\theta}{4\pi} \quad (1)$$

Figure 10:
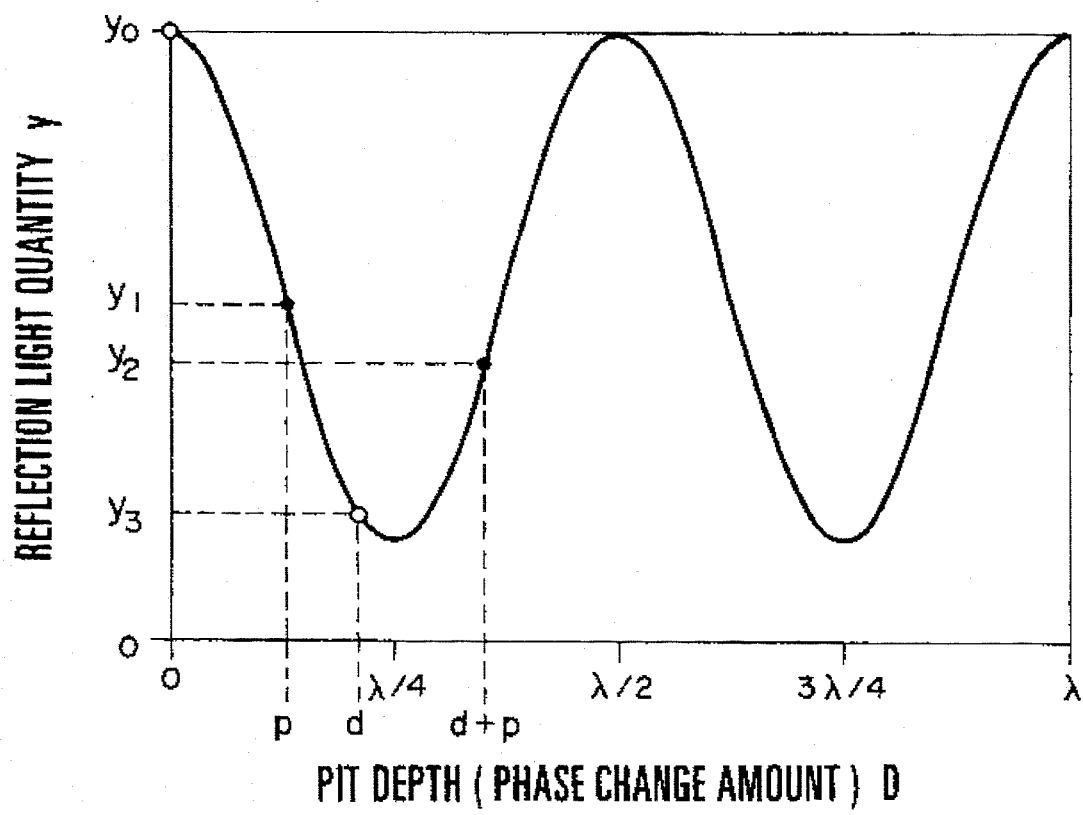
FIG. 10 is a graph of characteristic showing the relation between the phase pit depth and the reflection light quantity.

FIG. 10 graphically shows the relation between depth D of a phase pit and reflection light quantity y. Generally, the reflection light quantity y is expressed by $$y = k_1 \left( 1 + k_2 \cos \frac{4\pi \times D}{\lambda} \right) \text{ [rad]} \quad (2)$$

where $k_1$ and $k_2$ ($\leq 1$) are coefficients. By substituting the aforementioned depth p and depth d+p to depth D in the above equation, there result $$y_1 = k_1 \left( 1 + k_2 \cos \frac{4\pi \times p}{\lambda} \right) \text{ [rad]} \quad (3)$$

$$y_2 = k_1 \left( 1 + k_2 \cos \frac{4\pi \times (d+p)}{\lambda} \right) \text{ [rad]} \quad (4)$$

Then, by letting $y_1$ and $y_2$ be $y_1=y_2$, the reflection light quantity at a phase pit of depth p equals that at a phase pit of depth d+p. By solving $y_1=y_2$ for p, $$p = \frac{n}{4} \lambda - \frac{d}{2} \quad (n: \text{integer}) \quad (5)$$

results. Then, equation (5) is combined with equation (1) and solved for Δθ to provide $$\Delta\theta = \left( n - \frac{2d}{\lambda} \right) \pi \quad (n: \text{integer}) \quad (6)$$

Thus, by setting the phase change difference Δθ and the phase pit depth d such that the relation of equation (6) is satisfied, the reflection light quantity at the masked region land 110b of depth p can equal that at the masked region phase pit of depth d+p when the masked region is viewed from a reference height of the window regional and 110a. Accordingly, the masked region is seen as if it contains no phase pit.

On the other hand, a phase pit 109a present in the window region is desired to be detected in the form of as large a signal as possible. Thus, where the reflection light quantity is yo in the absence of a phase pit, that is, when the depth D is zero and the reflection light quantity is $y_3$ when the depth D is d, $y_0/y_3$ must be set to as large a value as possible.

Combinations of phase pit depth d and phase change difference $\Delta\theta$ which meet the above two conditions are, for example $$d=\lambda/6, \Delta\theta=120[Deg] \quad (7)$$

$$d=\lambda/6, \Delta\theta=300(=-60)[Deg] \quad (8)$$

$$d=\lambda/4, \Delta\theta=90[Deg] \quad (9)$$

$$d=\lambda/4, \Delta\theta=270(=-90)[Deg] \quad (10)$$

where $\Delta\theta$ in radian is converted into numerical values in degree. An example of concrete numerical values of thickness of individual films in the light control layer 102 will now be described.

Figure 11A:
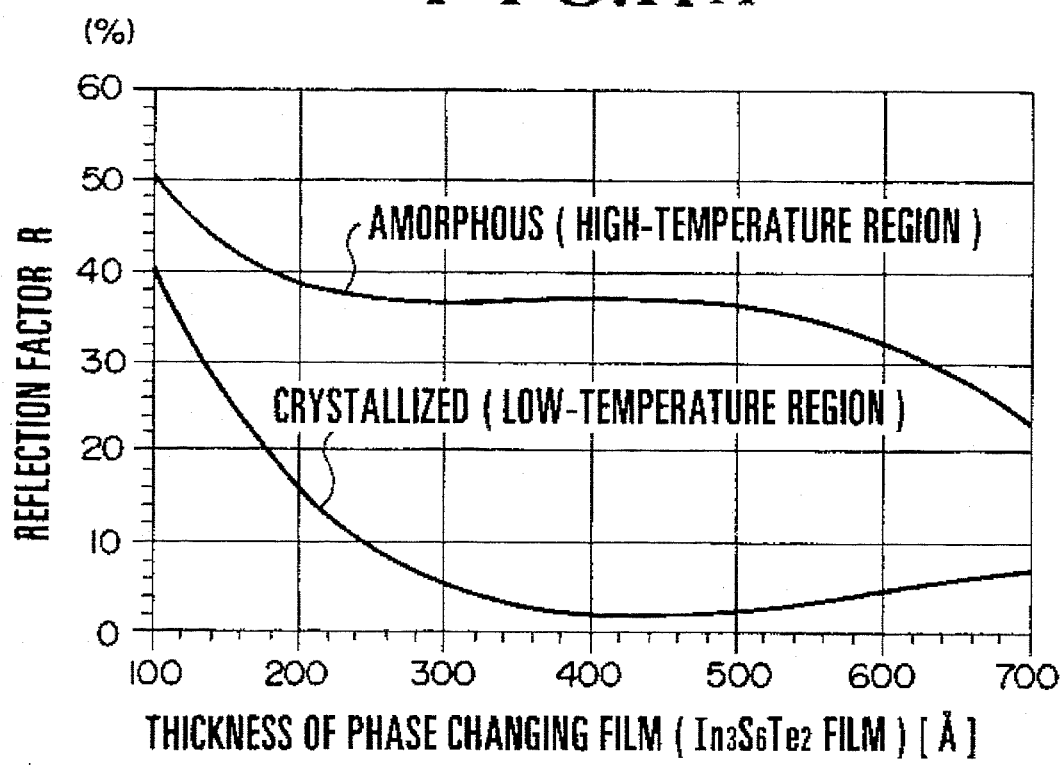
FIGS. 11A and 11B are graphs of characteristics showing the reflection factor and the phase change amount, respectively, in the third embodiment of the optical disc according to the invention.
Figure 11B:
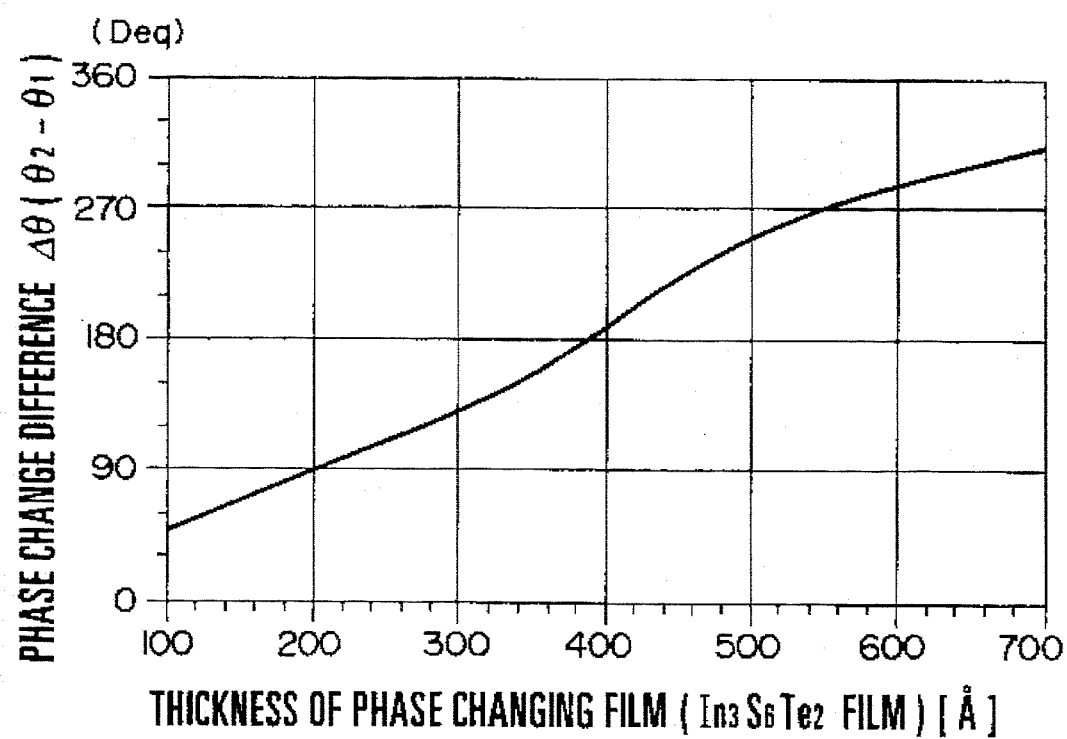

When the films are made of such materials as described previously, the thickness of the phase changing film is related to the reflection factor as shown in FIG. 11A and to the phase change difference $\Delta\theta$ as shown in FIG. 11B. In these Figures, the first and second light interference films 103 and 105 shown in FIG. 2 have each a constant thickness of 700Å. In FIG. 11A showing the relation between the phase changing film thickness and the reflection factor, reflection factor curve ($R_7$) is obtained when the phase changing film 104 is crystallized and reflection factor curve ($R_8$) is obtained when the phase changing film 104 becomes amorphous. In FIG. 11B showing the relation between the phase changing film thickness and the phase change difference $\Delta\theta$ [Deg], it is indicated that the thickness of the phase changing film is about 280Å to meet, for example, $\Delta\theta=120$ [Deg] in equation (7). In this case, the reflection factor $R_7$ is nearly 7% and the reflection factor $R_8$ is nearly 37%.

The present embodiment has been described by way of the optical disc of high-temperature portion window type but it may also be applied to the optical disc of high-temperature portion masking type in quite a similar manner.

In the previously-described first to third embodiments of the optical disc according to the present invention, compositions of the transparent substrate 101, light reflection film 106 and light control layer 102 of the optical disc 100 are not limited to those exemplified in the precedence and for example, the phase changing film 104 included in the light control layer 102 may be made of various materials of chalcogenide system or materials as represented by low melting point metals such as Ag—Zn, Bi and In whose refractive index (reflection factor) changes reversibly with changes in temperature. The light interference film may be omitted as necessary or an optical energy absorbing layer may be added to provide a multi-layer structure of four or more layers which can improve the sensitivity to phase change.

Further, a light control layer having exactly the same function can be constructed by using materials whose reflection factor changes reversibly with light intensity of an irradiated light spot, such as liquid crystal, photochromic material, semiconductor and saturable absorber as represented by organic coloring matter.

Incidentally, in the foregoing embodiments, the optical disc is exemplified in which the phase state changes reversibly with a change in temperature of the light control layer caused by a single light spot but some phase changing materials are relatively stable in the amorphous state and therefore once rendered to be amorphous under the irradiation of a light spot, they cannot recover their crystallized state unless irradiated again with a light spot for crystallization. Even in that case, the present invention can be applied by employing, as exemplified in the first embodiment of the optical disc apparatus, two light spots irradiating the same track of the optical disc, of which one is used for reproduction and the other follows the reproduction light spot so as to be used for recrystallization.

Next, an optical disc apparatus will be described which is suited to perform initialization (for example, shifting from amorphous state to crystallized state) of the light control layer by using a single light spot and to perform stable initialization each time that reproduction repeats itself.

Figure 12:
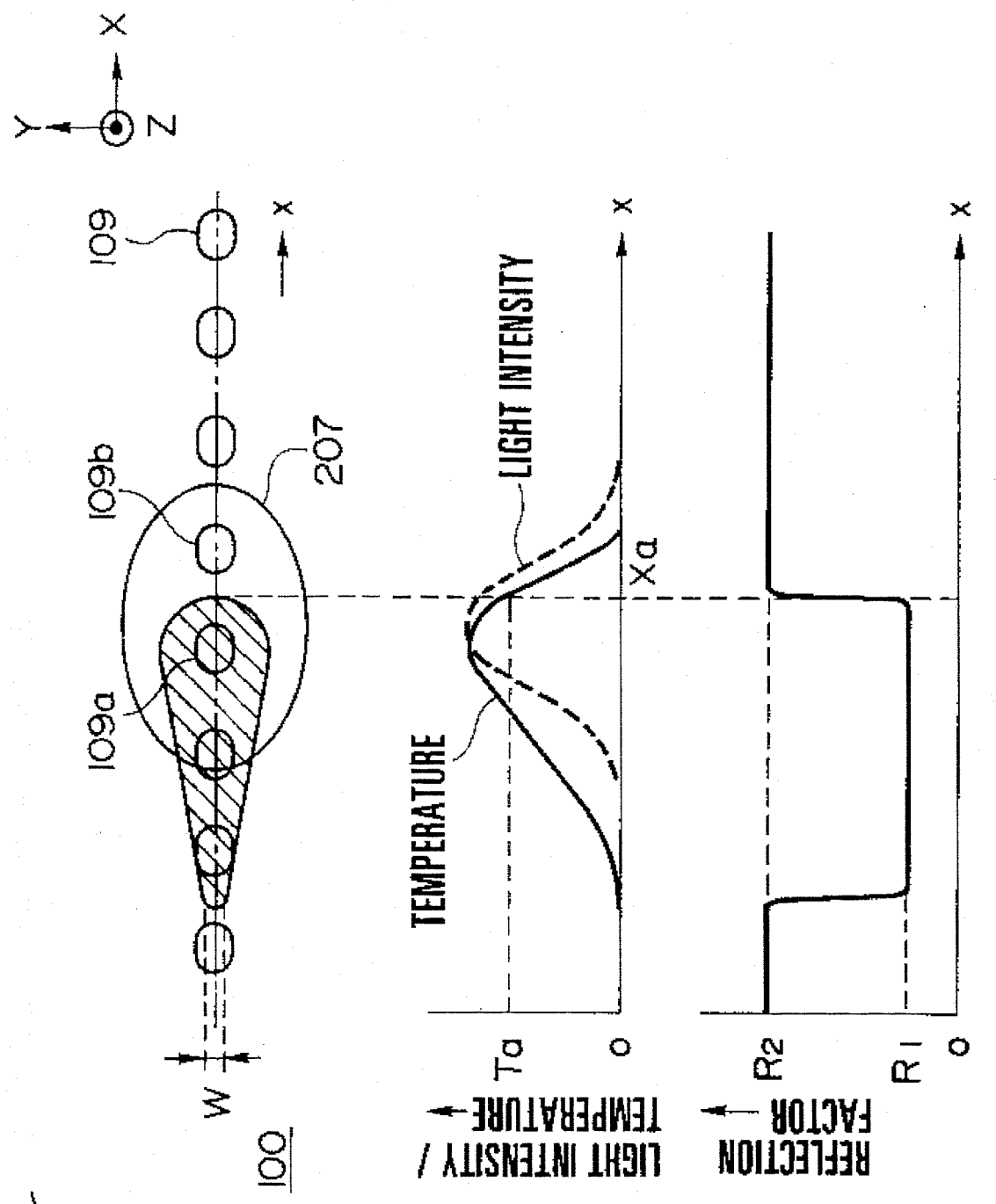
FIG. 12 is a diagram showing the operational principle of a second embodiment of the optical disc apparatus according to the invention.

FIG. 12 schematically shows the principle of operation of a second embodiment of the optical disc apparatus according to the present invention. For example, an optical disc 100 is of the type of the first embodiment described in connection with FIGS. 1 and 3. When an elliptical light spot 207 which is elongated in the track direction (X direction) of the optical disc is irradiated, light intensity inside the light spot 207 is distributed as shown at dotted line in section (ii) and the phase changing film 104 has temperature distribution which is slightly retarded in the scanning direction of the light spot 207 (solid line in section (ii)). As the light spot 207 scans in the X direction of FIG. 12, the phase changing film 104 shifts from crystallized state to amorphous state at the threshold of its melting point Ta and after the light spot 207 has passed, the phase changing film shifts to the original cryatallized state under the influence of the cooling effect by the aluminum film. In that case, since the light spot 207 is of an ellipse which is elongated in the track direction, the time for cooling the phase changing film heated to above the melting point Ta is prolonged as compared to the case of the aforementioned circular spot 201.

Figure 13A:
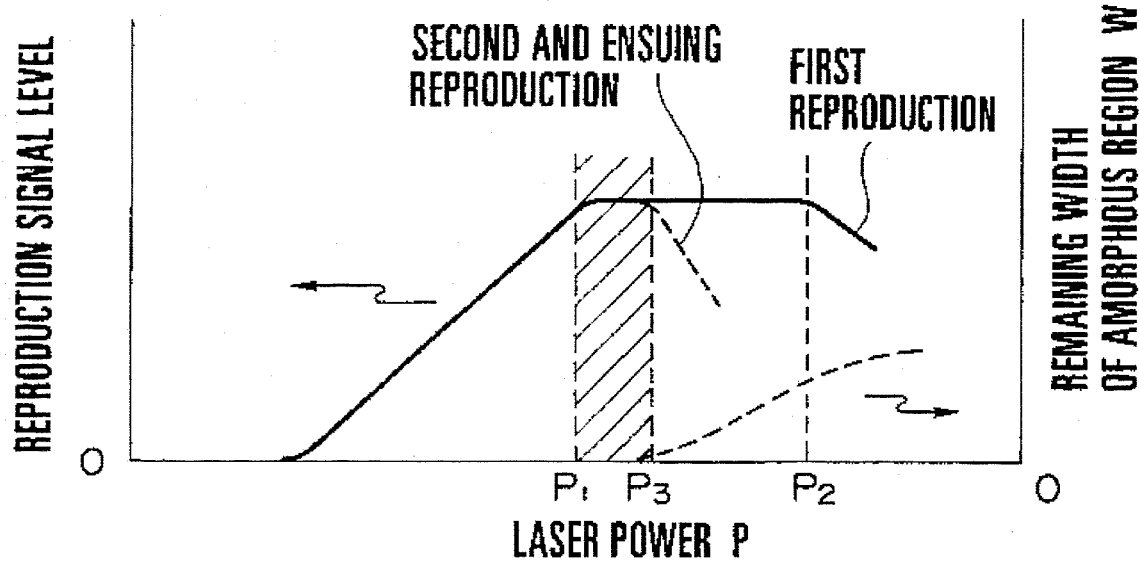
FIG. 13A and 13B are graphs of characteristics showing the relation between reproduction laser power and reproduction signal level.
Figure 13B:
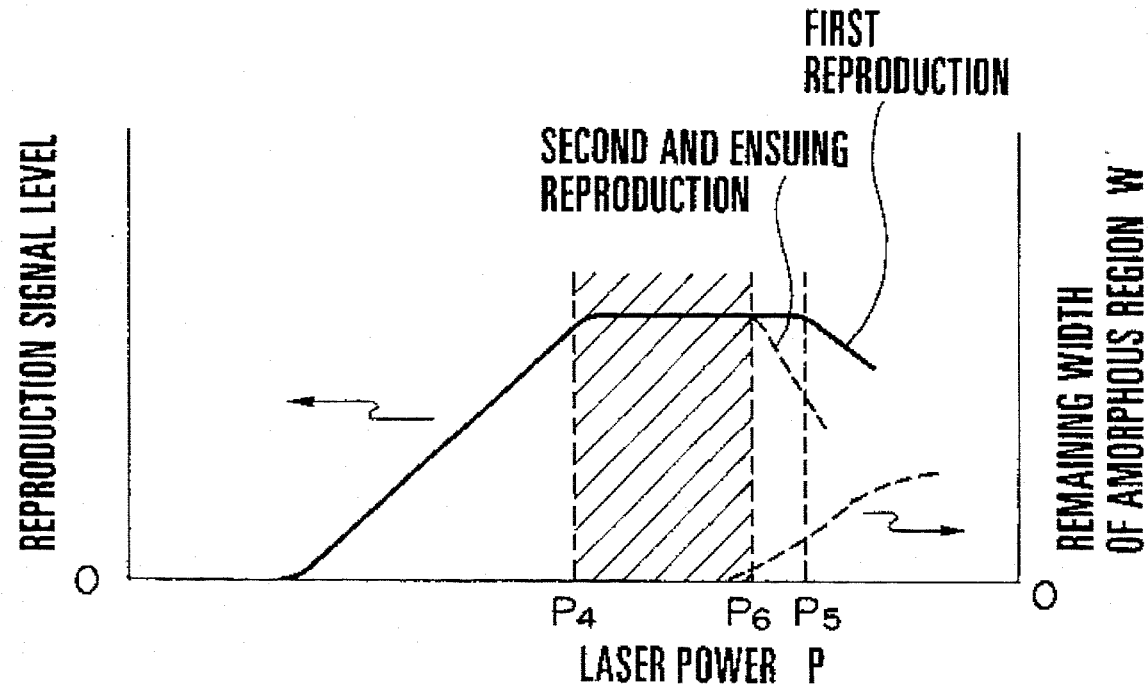

FIGS. 13A and 13B show each characteristics depicting the relation between reproduction laser power P and reproduction level of phase pit signal and the relation between reproduction laser power P and width W of an amorphous portion of phase change film 104 remaining after reproduction, FIG. 13A being for a circular light spot and FIG. 13B being for an elliptical light spot as in the case of the present embodiment. The elliptical light spot 207 has an aspect ratio of 1:1.5 in the present embodiment. In the first reproduction of the optical disc 100 which is crystallized throughout its surface, power P is increased so that the region inside the light spot 207 may partly become amorphous and the reproduction signal may rise so as to be almost maximized at power $P_1$ (FIG. 13A) or power $P_4$ (FIG. 13B). As power P is further raised, the amorphous portion inside the light spot 207 expands until part of a pit 109b also becomes amorphous at power exceeding $P_2$ (FIG. 13A) or $P_5$ (FIG. 13B) and the reproduction signal decreases. At that time, on the other hand, a portion of the phase changing film near the center of track which has become amorphous cannot recover its original crystallized state at the threshold of power $P_3$ or $P_6$ and the width W of the amorphous portion increases as power P increases. As a consequence, in the second and ensuing reproduction, the reproduction signal level abruptly decreases at power of $P_3$ or more (FIG. 13A) or at power of $P_6$ or more (FIG. 13B). Accordingly, the range of reproduction laser power permissible for repetitive reproduction is between $P_1$ and $P_3$ for the circular light spot and between $P_4$ and $P_6$ for the elliptical light spot, indicating that the range of reproduction power P is about three times wider for the elliptical light spot than for the circular light spot. Therefore, with the elliptical light spot used, the reproduction signal level is hardly affected by a variation in reproduction laser power due to dirts and dusts in the optical reproducing apparatus and the optical disc, making it possible to carry out stable repetitive reproduction.

The aspect ratio of the light spot 207 is not always required to be 1:1.5 but may be selected suitably in accordance with the structure of the optical disc and the scanning speed of the light spot. Generally, an optimum value of the aspect ratio falls within a range of from 1:1.2 to 1:2.0 or may be 1:2.0 or more.

In the conventional reproduction of phase pit disc, the optical resolution decreases when the light spot of an ellipse which is elongated in the track direction is used but in the present embodiment, the area of the window region inside the light spot 207 can be controlled by the reproduction laser power and degradation in resolution does not results.

Figure 15:
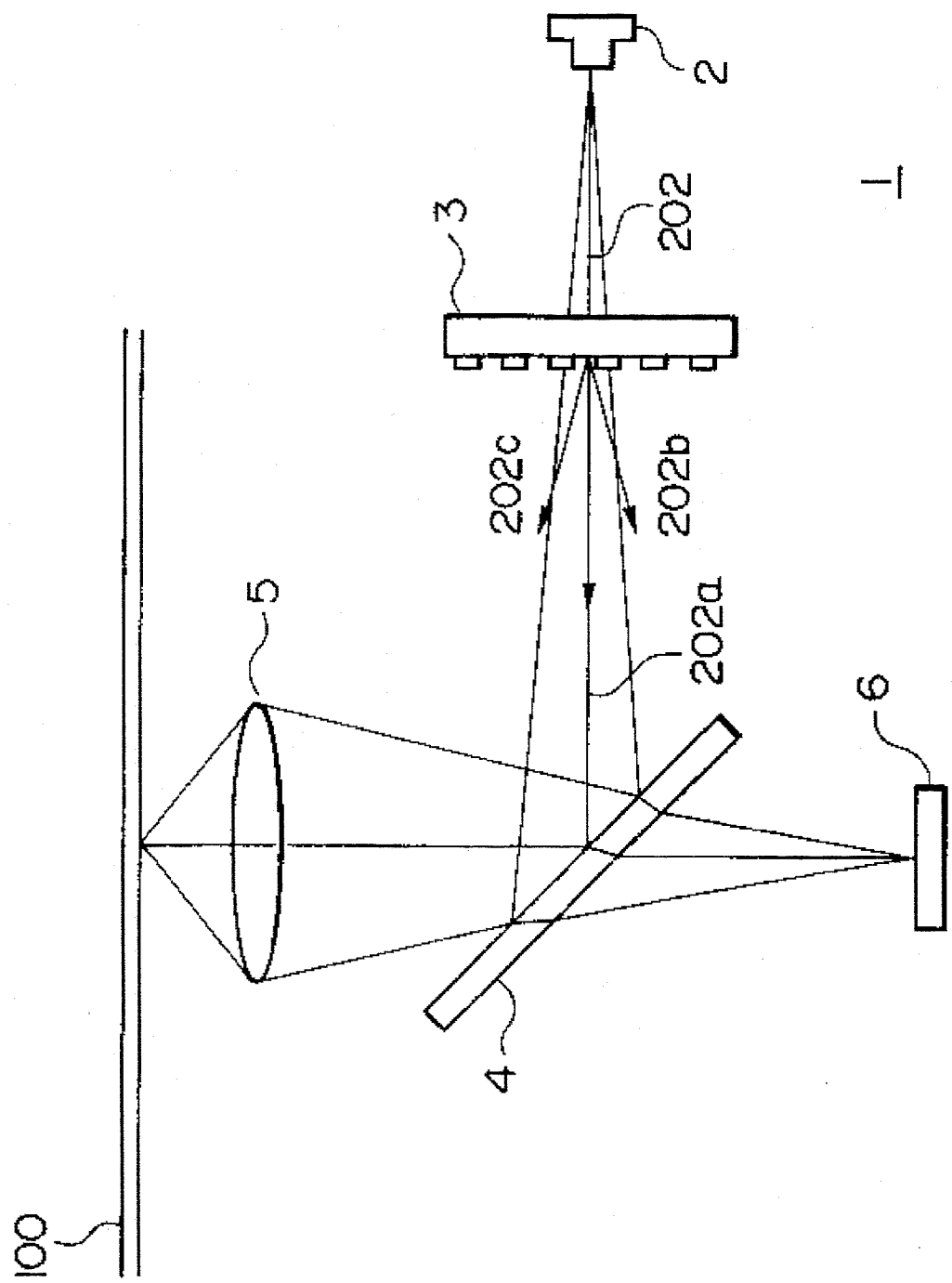
FIG. 15 is a schematic diagram showing a principal general construction of an optical head.

FIG. 14 is a block diagram showing a signal detection method in the second embodiment of the optical disc apparatus according to the invention. The optical head used in the present embodiment is constructed as shown in FIG. 15. In the optical head generally designated by reference numeral 1, diverging flux 202 emitted from a semiconductor laser 2 is separated by a diffraction grating 3 into a main flux beam 202a and sub-flux beams 202b and 202c. These three flux beams are reflected at the surface of a half mirror 4 and focused by an objective lens 5 to form light spots 207a, 207b and 207c (see FIG. 14), respectively, on an optical disc 100.

Figure 16:
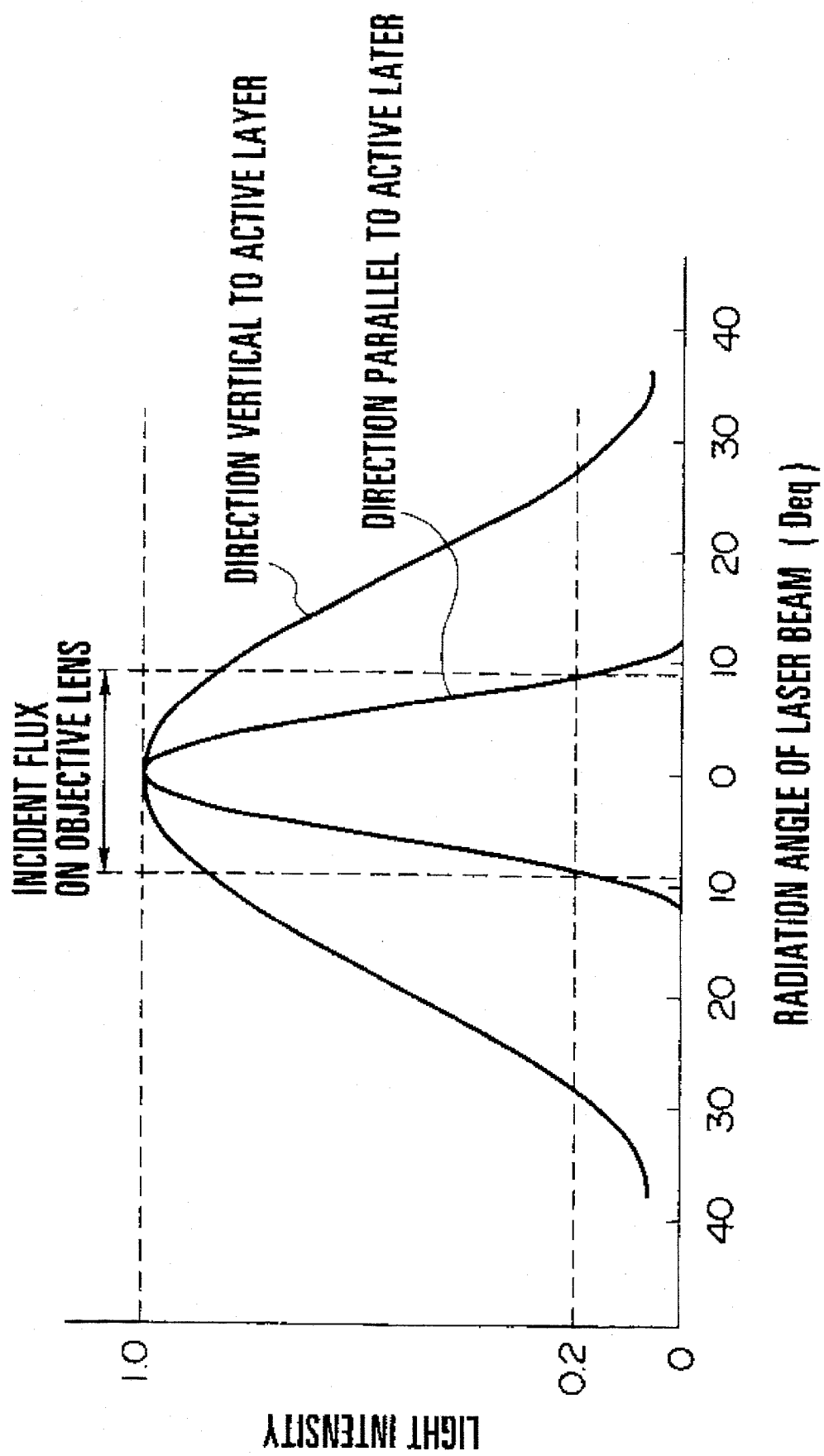
FIG. 16 is a graph showing characteristics of a far-point image of a semiconductor laser.

FIG. 16 is a graph of characteristics showing intensity distribution of light emitted from the semiconductor laser 2 and in the Figure, light intensity in a direction parallel to an active layer corresponds to light intensity on XZ plane of the light emitted from the semiconductor laser 2 in FIG. 15. In the present embodiment, numerical aperture NA of the light-source side of the objective lens 5 is selected so that light flux within a radiation angle of 8 degrees of the laser beam may be incident on the objective lens 5 (NA is about 0.14). Further, the mounting direction of the semiconductor laser 2 is selected such that a direction of light flux incident on objective lens 5, which direction is parallel to the active layer of semiconductor laser 2 imagined on a cross-section orthogonal to the light propagation direction of the light flux, substantially coincides with the track direction (X direction) of the optical disc 100. With the above construction, light intensity owned by light flux incident on the objective lens 5 at the peripheral portion thereof is 20% or less in the track direction and 50% or more in the radial direction (Y direction) as compared to light intensity owned by the light flux near the center. The smaller the light intensity possessed by light flux incident on the objective lens at the peripheral portion thereof, the larger the light spot becomes and therefore, by taking the above into design consider at ion, the light spot on the optical disc 100 can be of an ellipse which is elongated in the track direction as shown in FIG. 14.

Next, the signal detection method will be described. A great number of tracks each composed of a phase pit train are formed on the optical disc in accordance with a recorded signal, and the spacing between adjacent tracks (track pitch) is Tp. When the light spot 207a is centered on a track composed of a pit train 109, the light spots 207b and 207c are respectively displaced by ⁵⁄₄ Tp in the radial direction (Y direction) of the optical disc 100 and by 20 to 30 microns in the track direction (X direction). In a region 405, the phase changing film 104 becomes amorphous and exhibits a low reflection factor.

The light spots 207a, 207b and 207c are reflected by the optical disc 100 and reflection beams are respectively incident on photoelectric conversion elements 22a, 22b and 22c of a photoelectric detector 22 and converted into electric signals. Of them, a signal 301 from the photoelectric conversion element 22a is used as a reproduction signal of phase pit information recorded on the optical disc 100. On the other hand, servo signals are generated on the basis of signals from the photoelectric conversion elements 22b and 22c as will be described below. Since the reflection beam is given astigmatism by the half mirror 4, the direction of ellipse of the light spot on the photodetector 22 is orthogonal to the light spot on the optical disc 100. The photoelectric conversion element 22c is divided into four regions and signals on diagonal regions are added together to provide two signals which in turn are applied to a differential amplifier 24, at which a difference between the two input signals is calculated to produce a focusing error signal 303. On the other hand, signals of the four regions of the photoelectric conversion element 22c are added together by an adder 23 and a difference between an output signal of the adder 23 and an output signal of the photoelectric conversion element 22b is calculated by a differential amplifier 25 to produce a tracking error signal 302. Generally, the focusing error signal is detected on the basis of a reflection beam of the main flux, that is, light spot 207a but in the present embodiment, in order to avoid the influence of the region 405, the focusing error signal is detected on the basis of a reflection beam of the light spot 207c. The radial spacing between the light spots 207a and each of the light spots 207b and 207c is set to ⁵⁄₄ Tp also with the aim of avoiding the influence of the region 405.

If the region 405 returns to the original crystallized state before the light spot 207b passes by, then the radial spacing between the light spot 207a and each of the light spots 207b and 207c may be ¼ Tp as in the case of the general three-spot method. Conversely, in the case where the region 405 does not return to the original crystallized state before the light spot 207b passes by, a gain change circuit may be inserted between, for example, the photoelectric conversion element 22 band differential amplifier 25 to ensure that a decrease in reflection factor due to the region 405 can be corrected to generate a stable tracking error signal 302.

Figure 17:
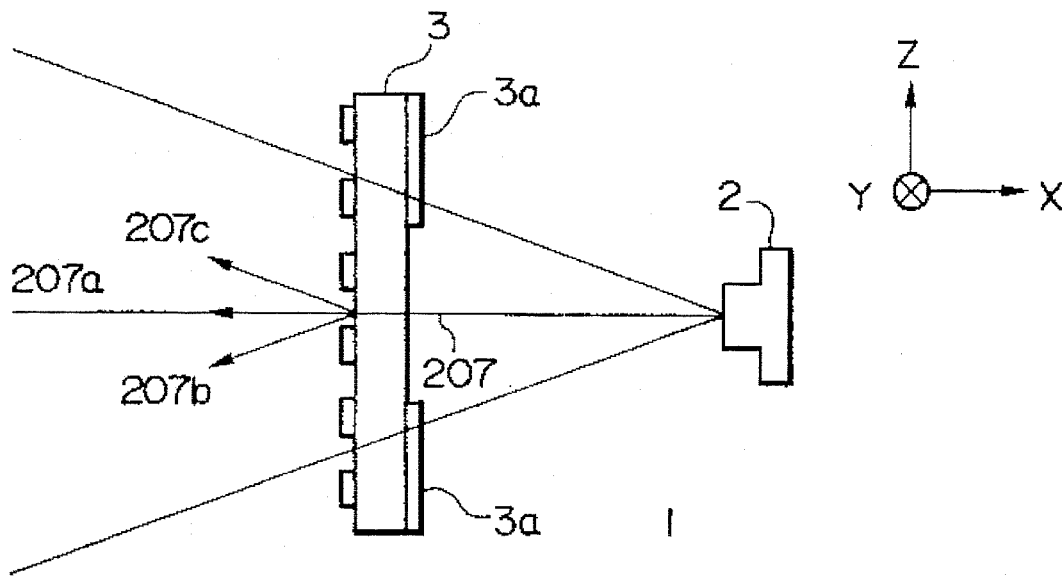
FIG. 17 is a diagram showing a partial construction of the optical head for obtaining an elliptical light spot.
Figure 18:
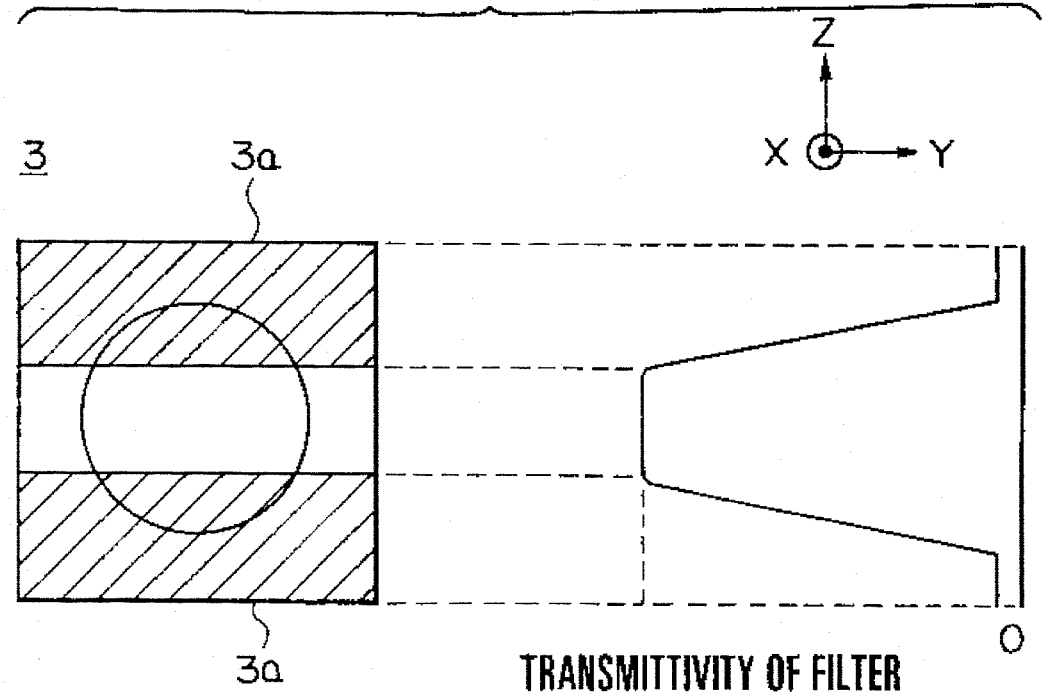
FIG. 18 is a diagram for explaining the relation between a diffraction grating with filter and a transmittivity characteristic of the filter.

A second method of obtaining an elliptical light spot will now be described. FIG. 17 is a diagram showing a partial construction of an optical head 1 and as shown therein a filter 3a is formed on one surface of a diffraction grating 3. FIG. 18 shows a plan view, on YZ plane, of the diffraction grating 3 and transmittivity of the filter 3a. The transmittivity of the filter 3a is smaller at its peripheral portion in Z direction than at its central portion and as a result, light intensity of flux incident on the objective lens 5 is decreased at its peripheral portion in the track direction (X direction) and an elliptical light spot which is elongated in the track direction can be obtained on the optical disc 100. An elliptical light spot can be obtained through methods other than the above, for example, a method in which the semiconductor laser 2 is given astigmatism difference (the beam waist is different for a direction parallel to the active layer and a direction vertical thereto) or a method in which a cylindrical lens is inserted in the light path between the semiconductor laser 2 and the half mirror 4.

Figure 19:
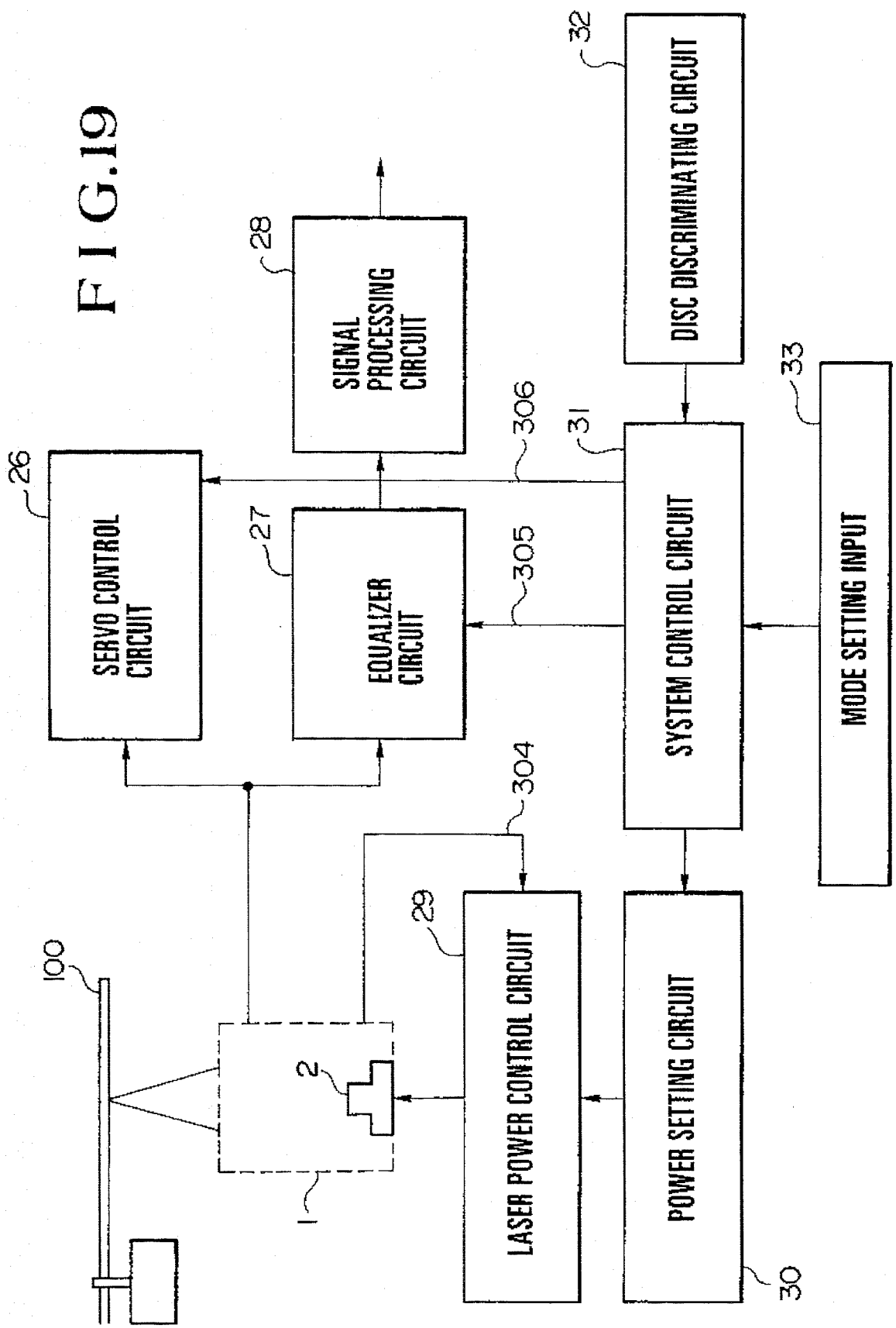
FIG. 19 is a block diagram showing a third embodiment of the optical disc apparatus according to the invention.

FIG. 19 is a block diagram showing a system construction of a third embodiment of the optical disc apparatus according to the present invention. In the drawing, an optical disc designated at reference numeral 100 stands for, for example, either the conventional phase pit type optical disc or an optical disc applied with the present invention which can reproduce high density phase pit information. An optical head 1 is comprised of a laser 2 and additional optical parts such as an objective lens not shown and is movable radially of the optical disc 100. An output signal from the optical head 1 is inputted to a servo control circuit 26 and a waveform equalizer circuit 27. In the servo control circuit 26, in addition to the aforementioned pick-up servo control based on the focusing and tracking error signals, control of rotation of the disc motor or radial shift of the optical head 1 is carried out. The equalizer circuit 27 responds to a control signal 305 from a system control circuit 31 to switch its characteristics in accordance with the kind of optical disc. A waveform is equalized in the waveform equalizer circuit 27 such that a reproduction signal has an optimum eye pattern and subsequently inputted to a signal processing circuit 28 so as to undergo therein such a processing as demodulation.

On the other hand, the laser 2 in the optical head 1 responds to an output setting value of a power setting circuit 30 and an output of a detector for laser power monitoring provided to the optical head 1 (for detection of a back light output or a front light output of the laser 2) to control its emitting output such that the emitting output equals laser power set by the power setting circuit 30. The power setting circuit 30 is controlled by the system control circuit 31 which is switched by a disc discriminating circuit 32 or by the condition of an input 33 applied through key operation or from an external processing unit.

When the aforementioned conventional phase pit type disc or the optical disc which permits reproduction of high density phase pit information is protected by a disc cassette, like a so-called floppy disc or an optical disc for data standardized pursuant to ISO (International Organization for Standardization), the kind of disc can be discriminated by the disc cassette. Thus, an identification hole provided in the disc cassette is detected by the disc discriminating circuit 32 (for example, a switch or a photosensor), the power setting circuit 30 is switched such that output power of the laser 2 is lowered in the case of the conventional phase pit type disc but is raised in the case of the optical disc which permits reproduction of high density phase pit information, and in compliance with that switching, the circuit characteristics (for example, circuit gain) of the servo control circuit is switched using a control signal 306 from the system control circuit 31. For the conventional phase pit type disc, the reproduction laser power is typically set to 1 mW or less (about 0.1 to 0.2 mW in the case of a disc of aluminum reflection film type) and for the optical disc capable of permitting reproduction of high density phase pit information in which the disc reflection factor changes with temperatures, reproduction laser power of 2 to 3 mW or more is needed.

When the optical disc is not protected by the disc cassette, like the compact disc, reproduction is carried out with the output power of laser 2 set to such a low level as required for the conventional phase pit type disc. Under this condition, a region of TOC (Table of Contents) or the like provided at the innermost periphery of disc is reproduced and when data is readable normally, various kinds of control are effected on the basis of information recorded on the TOC. In the event that information is not allowed to be reproduced under the low power condition, focusing control is once turned off and thereafter the power setting circuit 30 is switched to set the output power to a higher level and at the same time the gain of the servo control circuit 26 is also switched so as to again perform reproduction. As in the precedence, when the TOC area at the innermost periphery of disc is reproduced and data is allowed to be read normally, various kinds of control is carried out on the basis of information recorded on the TOC. In that case, even if a write-once type optical disc formed of a film of a material such as organic coloring matter for which reproduction laser power of relatively low level is allowed is inserted, the contents recorded on the disc will not be destroyed. In the case of an optical disc of high density phase pit type in which a phase pit is read while the reflection factor being partly changed in side a scanning light spot for reproduction, the output power of the laser 2 is decreased by switching the host computer or the external signal processing unit or by switching the setting value of the power setting circuit 30 in the absence of a reproduction request from the outside (in a so-called stand-by mode). In this case, the gain of the servo control circuit 26 is switched in accordance with the above switching. Thus, the number of operations of changing reflection factor of the phase changing film 104 can be decreased and the life of repetitive reproduction of the disc can be prolonged.

Figure 20:
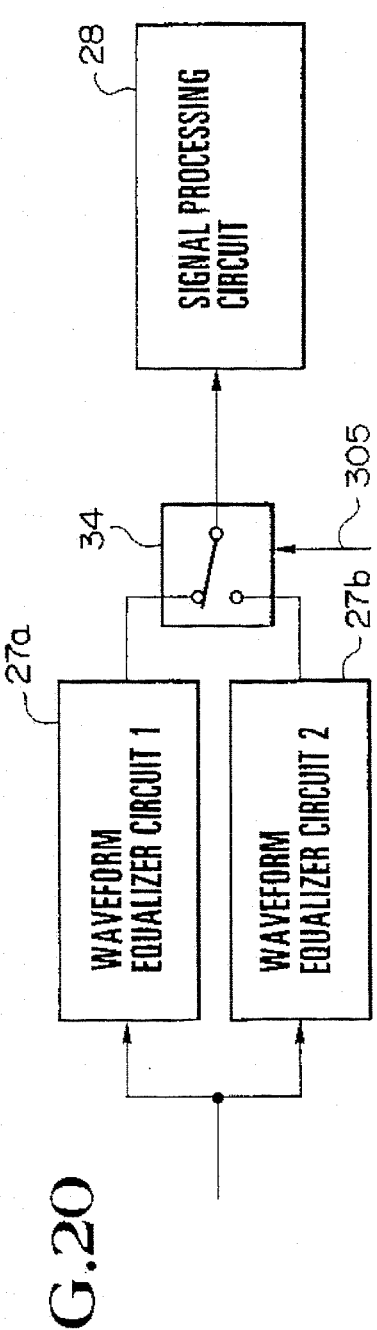
FIG. 20 is a circuit block diagram showing an example of an equalizer used in the optical disc apparatus shown in FIG. 19.
Figure 21:
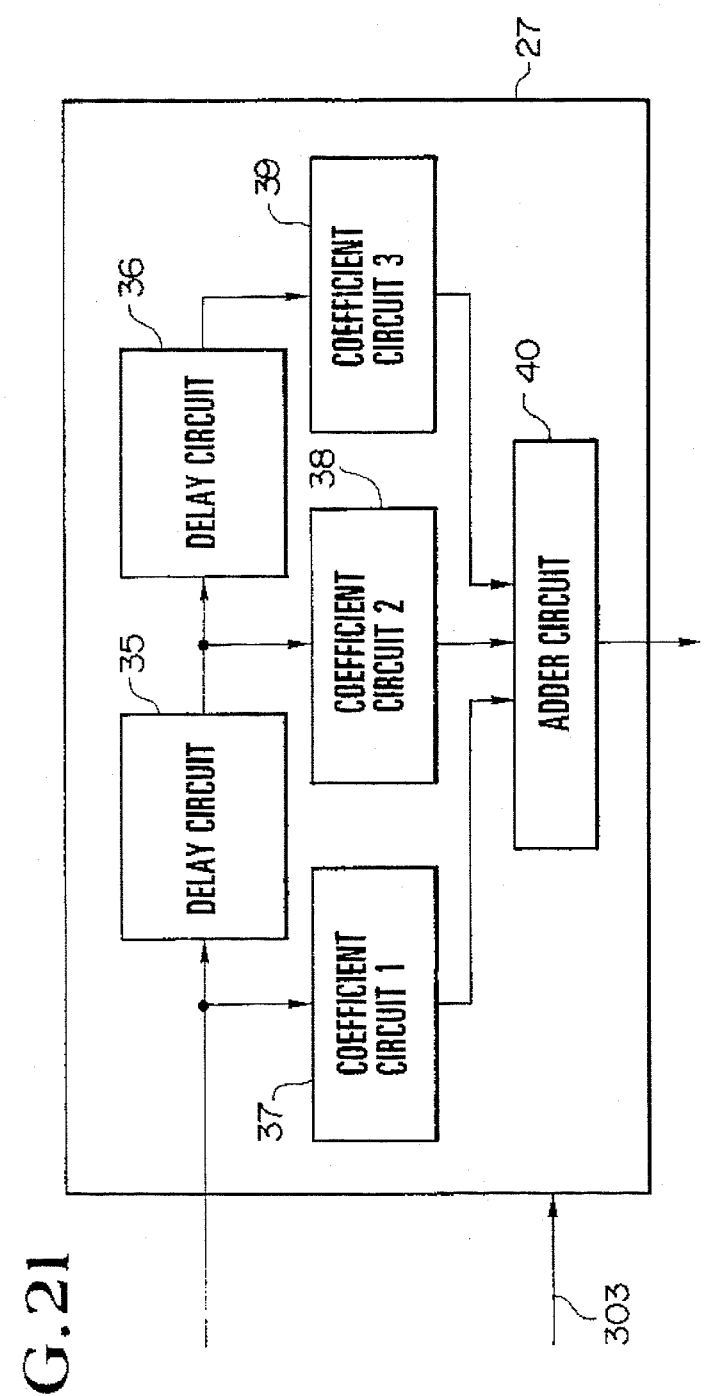
FIG. 21 is a circuit block diagram showing another example of the waveform equalizer used in the optical disc apparatus shown in FIG. 19.

FIG. 20 is a block diagram showing an example of the equalizer circuit 27 for obtaining an equalized output optimized for individual optical discs. The equalizer circuits 27a and 27b having different characteristics, respectively, are provided and they are selectively switched by a switch 34. In this type of circuit, desired characteristics can be obtained easily but disadvantageously the number of parts is increased. Contrary to this, a second example shown in FIG. 21 is an equalizer circuit of transversal filter type in which setting values of coefficient circuits 37, 38 and 39 are switched to permit a single equalizer circuit to correspond to individual discs.

We claim:

1. An optical disc comprising:

phase pits formed in a transparent substrate in response to an information signal; and a light control layer;

wherein said light control layer changes reversibly a reflection factor in response to a temperature or a light intensity for a first laser beam having at least a predetermined wavelength $\lambda_1$ in which the reflection factor is increased at a high temperature region or a high light intensity region, said light control layer having a spectral characteristic so that the reflection factor has a greater predetermined value regardless of temperature or light intensity for a second laser beam having a wavelength $\lambda_2$ different from $\lambda_1$.

2. An optical disc according to claim 1, wherein a difference $\Delta\theta$ between a phase change amount caused in the wave front of a light beam reflected at a first one of reversibly changeable states of said light control layer and a phase change amount caused in the wave front of a light beam reflected at a second state of said light control layer is approximately related to an optical depth d of said phase pit and a wavelength $\lambda$ of light beam by $$\Delta\theta = \left( n - \frac{2d}{\lambda} \right) \pi \ (n: \text{integer}).$$

3. An optical disc according to claim 1, wherein said light control layer is made of one of a chalcogenide system material and a metal system material.

4. An optical signal reproducing apparatus for reproducing the optical disc according to claim 1, wherein a first light spot due to a first laser beam and a second light spot due to a second laser beam are both irradiated, an information signal recorded in the form of said phase pits is reproduced from said first light spot and at the same time, an irradiation position control signal for said first and second light spots is detected from said second light spot.

5. An optical signal reproducing apparatus for reproducing the optical disc according to claim 1, further comprising:

a laser beam source; and an objective lens for focusing a laser beam emitted from said laser beam source on said optical disc, wherein the shape of a light spot focused on said optical disc and used for reading a signal on said optical disc is of an ellipse which is elongated in the track direction of said optical disc.

6. An optical signal reproducing apparatus according to claim 5, wherein the aspect ratio of the elliptical light spot on said optical disc falls within a range of from 1:1.2 to 1:2.

7. An optical signal reproducing apparatus according to claim 5, wherein the light intensity possessed by light flux from said laser source and incident on said objective lens at the peripheral portion thereof in the track direction is 20% or less as compared to light intensity possessed by the light flux near the center of said objective lens.

8. An optical signal reproducing apparatus according to claim 5, wherein said laser beam source is a semiconductor laser and a direction of light flux emitted from said semiconductor laser and incident on said objective lens, which direction is parallel to the active layer of semiconductor laser imagined on a cross-section orthogonal to the light propagation direction of the light flux, coincides with the track direction of said optical disc.

9. An optical signal reproducing apparatus for reproducing the optical disc according to claim 1, wherein a mode other than a mode in which information recorded on said disc is read and delivered to an external apparatus, the output of reproduction laser power is decreased to prevent said light control layer from changing its state under the irradiation of a light spot.

10. An optical signal reproducing apparatus, wherein light flux emitted from a laser beam is separated into a principal flux beam and two or more sub-flux beams, said sub-flux beams are focused on said optical disc, and a tracking error signal is detected from said sub-flux beams, and a focusing error signal is detected from either one of said sub-flux beams, and wherein a gain switching circuit is provided which switches the gain for a signal output obtained from a sub-flux beam succeeding said principal flux beam, the gain of said gain switching circuit is switched in accordance with moving directions of said principal flux beam and sub-flux beam, and a tracking error signal is detected from an output of said gain switching circuit and an output representative of a sub-flux beam preceding said principal flux beam.

11. An optical signal reproducing apparatus, wherein disc discriminating means is provided which discriminates the kind of optical disc, and the reproduction laser power is set to a low level when an optical disc is identified as a high reflection factor disc of phase pit type by said disc discriminating means but is set to a high level when an optical disc is identified as the optical disc according to claim 1 by said disc discriminating means.

12. An optical signal reproducing apparatus, wherein disc discriminating means is provided which discriminates the kind of optical disc, and characteristics of a reproduction equalizing circuit are changed in accordance with the case where an optical disc is identified as a high reflection factor disc of phase pit type by said disc discriminating means and the case where an optical disc is identified as the optical disc according to claim 1.

13. An optical signal reproducing apparatus according to claim 10, wherein said optical disc has phase pits formed in a transparent substrate in accordance with an information signal, and a light control layer changed reversibly in at least one of a reflection factor, a phase change amount by which reflection light changes its phase relative to incident light and a spectral characteristic, in accordance with temperatures or light intensity.

14. An optical signal reproducing apparatus according to claim 10, wherein said sub-flux beams are respectively spaced by $\frac{5}{4}$ or more track pitch from said principal flux beam in the radial direction of said optical disc.

15. An optical disc comprising:

phase pits formed on a transparent substrate in response to an information signal; and a light control layer;

wherein said light control layer includes a first state and a second state changed reversibly in response to a temperature or a light intensity in which a predetermined light beam has a relationship such that a difference $\Delta\theta$ between a first phase change amount caused in a wave front of a light beam reflected at the first state of said light control layer and a second phase change amount caused in the wave front of the light beam reflected at the second state of said light control layer is substantially related by a following expression for an optical depth d of said phase pits and a wavelength $\lambda$ of the light beam;

$$\Delta\theta = \{n - (2d/\lambda)\}\pi \text{ (n: integer)}.$$

* * * * *